(12) United States Patent
Mikami et al.

(10) Patent No.: US 12,744,707 B2
(45) Date of Patent: Sep. 22, 2026

(54) TRANSFER DEVICE AND TRANSFER METHOD FOR DATA TRANSFER COMPATIBLE WITH A PLURALITY OF PROTOCOLS

(71) Applicant: Hitachi Industrial Equipment Systems Co., Ltd., Tokyo (JP)

(72) Inventors: Shugo Mikami, Tokyo (JP); Kazuma Koshide, Tokyo (JP); Mitsuhiro Imai, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/843,026

(22) PCT Filed: Feb. 16, 2023

(86) PCT No.: PCT/JP2023/005366
§ 371 (c)(1),
(2) Date: Aug. 30, 2024

(87) PCT Pub. No.: WO2023/181720
PCT Pub. Date: Sep. 28, 2023

(65) Prior Publication Data

US 2025/0184216 A1 Jun. 5, 2025

(30) Foreign Application Priority Data

Mar. 24, 2022 (JP) ................................ 2022-048121

(51) Int. Cl.
*G06F 15/177* (2006.01)
*H04L 41/0806* (2022.01)
(Continued)

(52) U.S. Cl.
CPC .......... *H04L 41/0806* (2013.01); *H04L 67/06* (2013.01); *H04L 69/18* (2013.01)

(58) Field of Classification Search
CPC ...... H04L 41/0806; H04L 67/06; H04L 69/18
(Continued)

(56) References Cited

U.S. PATENT DOCUMENTS 7,747,718 B2 * 6/2010 Shirane ................ H04L 67/303 709/223
7,996,506 B2 * 8/2011 Tagawa .............. H04L 41/0883 709/224

(Continued)

FOREIGN PATENT DOCUMENTS

JP 2009-118361 A 5/2009
WO WO-2021038527 A1 * 3/2021 .......... G06F 21/577

OTHER PUBLICATIONS

International Search Report (PCT/ISA/210) issued in PCT Application No. PCT/JP2023/005366 dated May 9, 2023 with English translation (5 pages).

(Continued)

*Primary Examiner* — Alicia Baturay
(74) *Attorney, Agent, or Firm* — Crowell & Moring LLP

(57) ABSTRACT

A transfer device receives data from a transmission source device, and stores the program group and initial setting information, the transfer device includes: wherein each program in the program group matches a reception protocol pertaining to reception of data from the transmission source device, a processing protocol pertaining to the process, or a transmission protocol pertaining to transmission of data to the destination device, wherein the initial setting information defines designation information that designates, for each protocol, the program matching the protocol, and wherein the processor executes: a reception process of receiving input of a first setting parameter to a first program that matches the reception protocol and the transmission protocol; an acquisition process of acquiring first designation information for designating the first program with
(Continued)

reference to the initial setting information; and an activation process of activating the first program using the first designation information and the first setting parameter.

8 Claims, 32 Drawing Sheets

(51) Int. Cl.
*H04L 67/06* (2022.01)
*H04L 69/18* (2022.01)

(58) Field of Classification Search
USPC .......................................................... 709/222
See application file for complete search history.

(56) References Cited

U.S. PATENT DOCUMENTS 10,740,253 B2 * 8/2020 Sisler ...................... H04L 67/08
10,802,458 B2 * 10/2020 Pierce ................... H04L 67/125
11,252,241 B2 * 2/2022 Krishna Dhulipala ...................... H04L 67/60
11,736,497 B1 * 8/2023 Rooyakkers ........ H04L 63/0823
11,902,386 B2 * 2/2024 Sandler ................... H04L 67/34
11,936,740 B2 * 3/2024 Mehmedagic ...... H04L 41/0226
12,013,687 B1 * 6/2024 Mazur ................ G05B 19/4185
12,047,494 B2 * 7/2024 Biham .................. H04L 9/3213
12,137,152 B2 * 11/2024 Harriman .............. G06F 9/4856
12,299,009 B2 * 5/2025 Schiavella ............ G06F 16/287
12,346,702 B1 * 7/2025 Burbine .............. G06F 9/44505
12,368,723 B2 * 7/2025 Mansfield ............... G06F 21/44
2008/0273486 A1 * 11/2008 Pratt ....................... H04L 67/52 370/328
2012/0297461 A1 * 11/2012 Pineau ................ H04L 63/0815 726/4
2022/0327219 A1 * 10/2022 Choi ..................... G06F 21/575
2025/0093834 A1 * 3/2025 Putman .............. G05B 19/0426
2025/0093836 A1 * 3/2025 Putman ................ G05B 19/056
2025/0093844 A1 * 3/2025 Putman .............. G05B 19/4083
2025/0094499 A1 * 3/2025 Putman ................. G06F 16/904
2025/0103027 A1 * 3/2025 Sandler ............ G05B 19/41845
2025/0106044 A1 * 3/2025 Golden ................. H04L 9/3268
2025/0110488 A1 * 4/2025 Huang ............. G05B 19/41885
2025/0238023 A1 * 7/2025 Mills ................... G06F 9/45558
2025/0251715 A1 * 8/2025 Anthony ................. G06F 13/20
2025/0264859 A1 * 8/2025 Spaner ............... G05B 19/4065
2025/0315688 A1 * 10/2025 Shan .................... G06N 3/0495
2025/0321555 A1 * 10/2025 Case .................... G05B 19/052
2025/0321556 A1 * 10/2025 Case .................... G05B 19/052
2025/0321557 A1 * 10/2025 Case .................... G05B 19/052
2025/0321566 A1 * 10/2025 Case .................. G05B 19/4155

OTHER PUBLICATIONS

Japanese-language Written Opinion (PCT/ISA/237) issued in PCT Application No. PCT/JP2023/005366 dated May 9, 2023 with English translation (5 pages).

* cited by examiner

| Protocol Category | | | Classification | Detailed Items | Setting Examples by User |
|---|---|---|---|---|---|
| Reception | Processing | Transmission | | | |
| ○ | | | Input Data Type | Port Number | 21(FTP) |
| | | ○ | Output Data Type | Port Number | 22(SFTP) |
| | | ○ | Connection Destination Device Restriction | MAC Address | 00-11-22-33 |
| | | | | IP Address | 192.168.1.10 |
| ○ | | | Connection Source Device Restriction | MAC Address | 01-02-03-04 |
| | | | | IP Address | 10.20.1.1 |
| | | ○ | Communication Path Encryption | Protocol | SFTP |
| | | | | Protocol Version | — |
| | | | | Address of Connection Source Device | 192.168.1.10 |
| | | | | Address of Connection Destination Device | 192.168.1.1 |
| | | | | Port Number | 22 |
| | | | | Encryption Algorithm | AES128 |
| | | | | Signature Algorithm | SHA256 |
| | ○ | | Log Acquisition | Operation Logs | — |
| | | | | Communication Logs | — |
| | | | | Log File Storage Location | ¥tmp¥log |
| | ○ | | Virus Check | Communication Packet (Header) | — |
| | | | | File | — |
| | | | | Main Device | — |

| Protocol Category | | | Classification | Detailed Items | Setting Examples by User |
|---|---|---|---|---|---|
| Reception | Processing | Transmission | | | |
| ○ | | | Legitimacy/Credibility of Connection Source Device | Authentication of Device | MAC Address/Device ID/Credential TPM |
| | | | | Authentication of Host | Host Name |
| | | | | Authentication of Logged In User | User Name |
| | | | | Current OS and Patch | Allowed OS and Patch Versions |
| | | | | Virus Check State | Pattern File Version |
| | | | | Frequency | At Every Communication/Only at Start Up |
| | | ○ | Legitimacy/Credibility of Connection Destination Device | Authentication of Device | MAC Address/Device ID/Credential TPM |
| | | | | Authentication of Host | Host Name |
| | | | | Authentication of Logged In User | User Name |
| | | | | Current OS and Patch | Allowed OS and Patch Versions |
| | | | | Virus Check State | Pattern File Version |
| | | | | Frequency | At Every Communication/Only at Start Up |
| | ○ | | Measure to Counter Vulnerability | Acquire List of Installed Packages | – |
| | | | | Update Installed Packages | – |
| | | | | Acquire List of Data-Collected Devices | – |

| Protocol Category | | | Classification | Detailed Items | Setting Examples by User |
|---|---|---|---|---|---|
| Reception | Processing | Transmission | | | |
| | ○ | | Behavior Detection | Activate EDR Software | – |
| | ○ | | Network Separation | Start Up Plurality of Containers, Hand Over Data in Shared Memory | – |
| | ○ | | Resource Setting (for Container) | CPU | 4 core |
| | | | | Memory | 4 GB |
| | ○ | | Protection against Data Leak<br>Protection of Stored Data | Encrypt Stored Data | – |
| | | | | Encrypt Folder | – |
| | | | | Encrypt Disk | – |
| | ○ | | Completeness Check | Data | – |
| | | | | Program | Hash Value of Container |
| | | | | Firmware | – |
| | | | | Frequency | Every Time/Initial Time Communication/Device (Device Information [OS version] + Addressing, Port Number) |
| | ○ | | Restrict Confidential Information to Internal Use Only (Compliance) | Record Keywords and Check File | Confidential, Personal Information… |

| Protocol Category | | | Classification | Detailed Items | Setting Examples by User |
|---|---|---|---|---|---|
| Reception | Processing | Transmission | | | |
| | ○ | | Failsafe (Measures to Handle Incidents) | Notify User | – |
| | | | | Isolate Relevant Data | – |
| | | | | Block Communications (All) | – |
| | | | | Block Communications (Communications from Relevant Device) | – |
| | | | | Block Communications (Communications on Relevant Protocol) | – |
| | ○ | | Apply Identifier to Industrial Control Device | ID | – |
| | | | | Electronic Certificate | – |
| | ○ | | Application of Time Stamp | | – |
| | ○ | | Application of Processing Evidence | Version Number of Definition File Used for Virus Check | – |

503
S513
Data
502
S511
Data
S514
Reception Notification
S512
Reception Notification
501

503
S522
Data
502
S521
Data
S523
Reception Notification
S524
Reception Notification
501

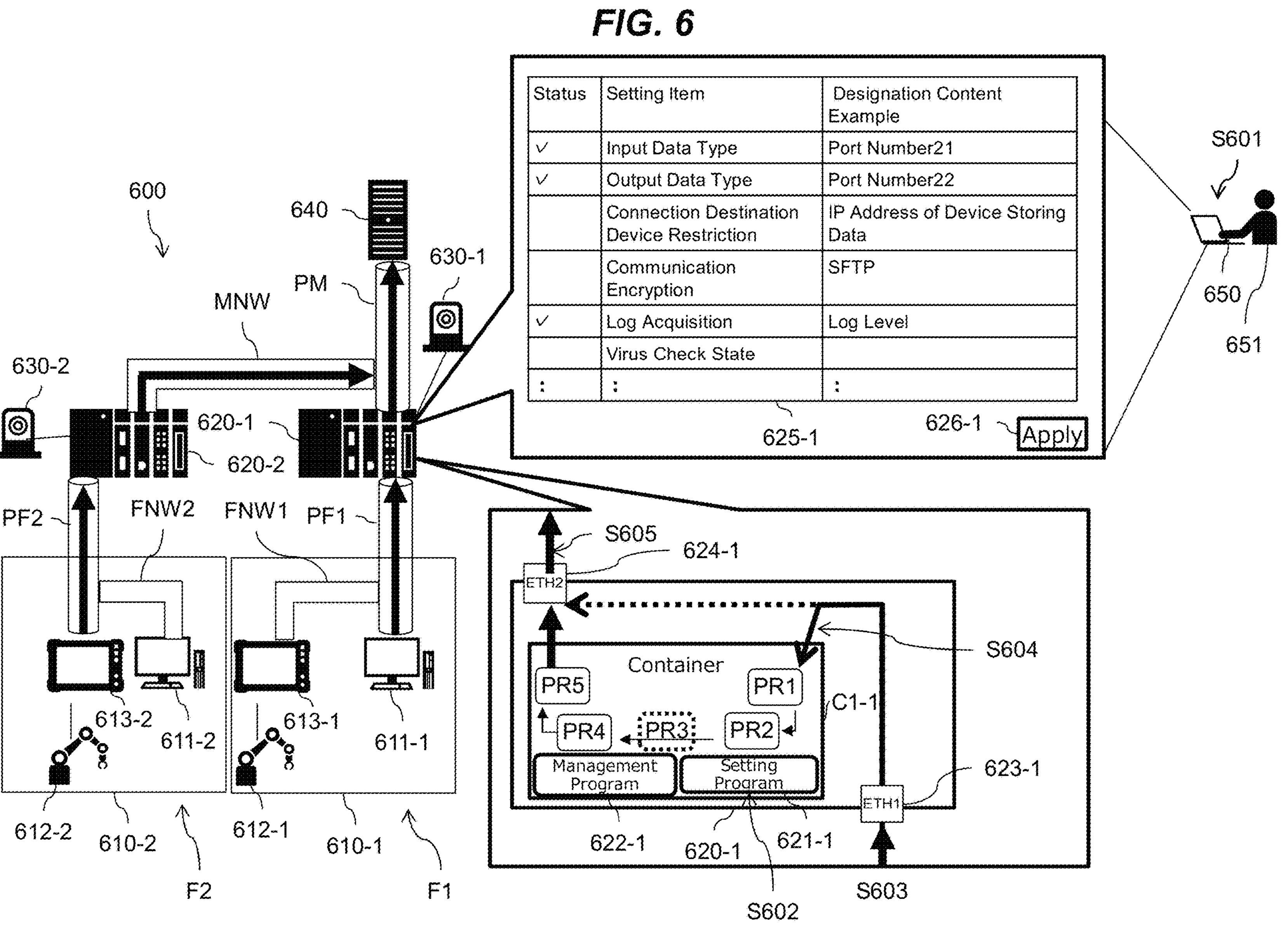
FIG. 6
Status
Setting Item
Designation Content Example
Input Data Type
Port Number21
Output Data Type
Port Number22
Connection Destination Device Restriction
IP Address of Device Storing Data
Communication Encryption
SFTP
Log Acquisition
Log Level
Virus Check State
625-1
626-1
Apply
S601
650
651
600
640
630-1
PM
MNW
630-2
620-1
620-2
PF2
FNW2
FNW1
PF1
613-2
611-2
613-1
611-1
612-2
610-2
612-1
610-1
F2
F1
S605
624-1
ETH2
Container
PR1
PR2
PR3
PR4
PR5
C1-1
Management Program
Setting Program
ETH1
S604
623-1
622-1
620-1
621-1
S602
S603

FIG. 10

1000 Initial Table 1001 1002 1003 1004 1005

| Setting Item | Setting Parameter Item | Program Name | Program Path | Item ID |
|---|---|---|---|---|
| Input Data Type | Port Number | Acceptpt | cnt/nwconfig | 1-1 |
| Output Data Type | Port Number | Acceptpt | cnt/nwconfig | 1-2 |
| Connection Destination Device Restriction | MAC Address | InLimit | cnt/nwconfig | 2-1 |
| | IP Address | InLimit | cnt/nwconfig | 2-2 |
| | Port Number | InLimit | cnt/nwconfig | 2-3 |
| Connection Source Device Restriction | MAC Address | OutLimit | cnt/nwconfig | 3-1 |
| | IP Address | OutLimit | cnt/nwconfig | 3-2 |
| | Port Number | OutLimit | cnt/nwconfig | 3-3 |
| Communication Path Encryption | Protocol | Crypt | cnt/nwconfig | 4-1 |
| Logs | | Log | cnt/log | 5-1 |
| Virus Check State | Communication Packet (Header) | Paccheck | prog/comchck | 6-1 |
| | File | Filecheck | prog/vircheck | 6-2 |
| Measure to Counter Vulnerability | Acquire List of Installed Packages | Pacget | mnt/pacget | 7-1 |
| | Update Installed Packages | Pacup | mnt/pacup | 7-2 |
| User Notification of Event | | alert | ver/alert | 8-1 |
| Behavior Detection | Activate EDR Software | Edr | prog/edr | 9-1 |
| Protection of Stored Data | Encrypt Stored Data | dataEnc | prog/enc | 10-1 |
| Completeness Check | Data | dataInt | var/dataInt | 11-1 |
| | Program | proInt | var/progInt | 11-2 |

FIG. 11

1100 User Setting Table 1101 1001 1102 1005

| Status | Setting Item | Setting Parameter Item | Item ID |
|---|---|---|---|
| ✓ | Input Data Type | Port Number | 1-1 |
| ✓ | Output Data Type | Port Number | 1-2 |
|  | Connection Destination Device Restriction | MAC Address | 2-1 |
| ✓ |  | 192.168.10.11 | 2-2 |
|  |  | Port Number | 2-3 |
|  | Connection Source Device Restriction | MAC Address | 3-1 |
| ✓ |  | 192.168.1.1 | 3-2 |
|  |  | Port Number | 3-3 |
|  | Communication Path Encryption | Protocol | 4-1 |
| ✓ | Logs |  | 5-1 |
|  | Virus Check State | Communication Packet (Header) | 6-1 |
| ✓ |  | File | 6-2 |
|  | Measure to Counter Vulnerability | Acquire List of Installed Packages | 7-1 |
|  |  | Update Installed Packages | 7-2 |
|  | User Notification of Event |  | 8-1 |
|  | Behavior Detection | Activate EDR Software | 9-1 |
|  | Protection of Stored Data | Encrypt Stored Data | 10-1 |
|  | Completeness Check | Data | 11-1 |
|  |  | Program | 11-2 |

FIG. 12

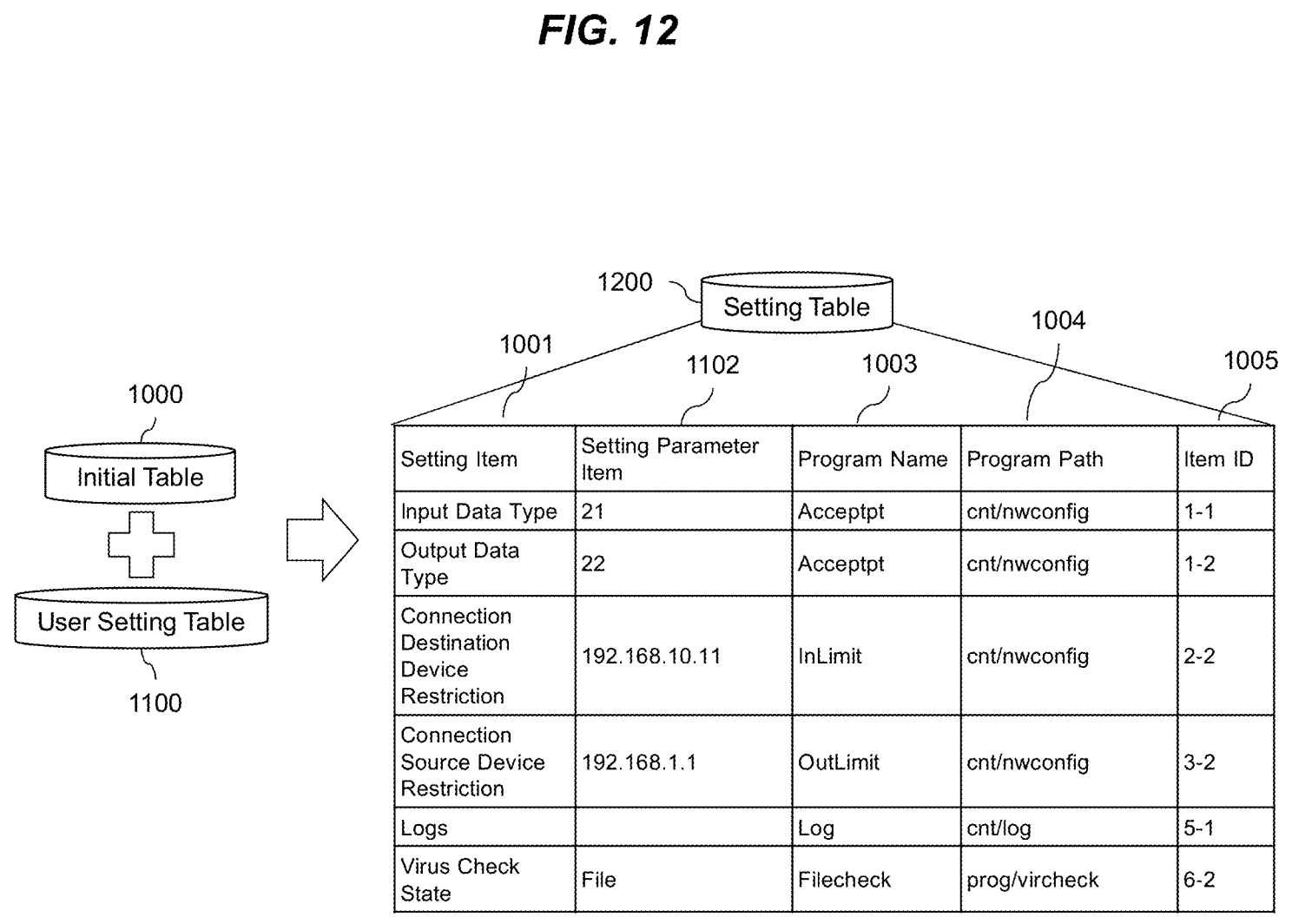

| Setting Item | Setting Parameter Item | Program Name | Program Path | Item ID |
|---|---|---|---|---|
| Input Data Type | 21 | Acceptpt | cnt/nwconfig | 1-1 |
| Output Data Type | 22 | Acceptpt | cnt/nwconfig | 1-2 |
| Connection Destination Device Restriction | 192.168.10.11 | InLimit | cnt/nwconfig | 2-2 |
| Connection Source Device Restriction | 192.168.1.1 | OutLimit | cnt/nwconfig | 3-2 |
| Logs | | Log | cnt/log | 5-1 |
| Virus Check State | File | Filecheck | prog/vircheck | 6-2 |

| Status (1601H) | Status (Container 1) (1601C1) | Status (Container 2) (1601C2) | Setting Item (1001) | Setting Parameter Item (1002) | Item ID (1005) |
|---|---|---|---|---|---|
| ✓ | — | — | Network Separation | | 0-1 |
| | | | Input Data Type | Port Number | 1-1 |
| | | | Output Data Type | Port Number | 1-2 |
| | | | Connection Destination Device Restriction | MAC Address | 2-1 |
| | | ✓ | | 192.168.10.11 | 2-2 |
| | | | | Port Number | 2-3 |
| | | | Connection Source Device Restriction | MAC Address | 3-1 |
| | ✓ | | | 192.168.1.1 | 3-2 |
| | | | | Port Number | 3-3 |
| | | | Communication Path Encryption | Protocol | 4-1 |
| | ✓ (Default) | | Logs | | 5-1 |
| | ✓ (Default) | | Virus Check State | Communication Packet (Header) | 6-1 |
| | ✓ | | | File | 6-2 |
| | — | — | | Main Device | 6-3 |
| | | | Measure to Counter Vulnerability | Acquire List of Installed Packages | 7-1 |
| | | | | Update Installed Packages | 7-2 |
| | | | User Notification of Event | | 8-1 |
| | | | Behavior Detection | Activate EDR Software | 9-1 |
| | | | Protection of Stored Data | Encrypt Stored Data | 10-1 |
| | — | — | | Encrypt Disk | 10-2 |
| | | | Completeness Check | Data | 11-1 |
| | | | | Program | 11-2 |
| | — | — | | Firmware | 11-3 |
| | — | — | Set Container Resource | CPU | 12-1 |
| | — | — | | Memory | 12-2 |

| Setting Item (1001) | Setting Parameter Item (1102) | Program Storage Location (1701) | Program Name (1003) | Program Path (1004) | Item ID (1005) |
|---|---|---|---|---|---|
| Network Separation | | Host | createCont | var/contcreate | 0-1 |
| Input Data Type | Port Number | Container | Acceptpt | cnt/nwconfig | 1-1 |
| Output Data Type | Port Number | Container | Acceptpt | cnt/nwconfig | 1-2 |
| Connection Destination Device Restriction | MAC Address | Container | InLimit | cnt/nwconfig | 2-1 |
| | IP Address | Container | InLimit | cnt/nwconfig | 2-2 |
| | Port Number | Container | InLimit | cnt/nwconfig | 2-3 |
| Connection Source Device Restriction | MAC Address | Container | OutLimit | cnt/nwconfig | 3-1 |
| | IP Address | Container | OutLimit | cnt/nwconfig | 3-2 |
| | Port Number | Container | OutLimit | cnt/nwconfig | 3-3 |
| Communication Path Encryption | Protocol | Container | Crypt | cnt/nwconfig | 4-1 |
| Logs | | Host | Log | cnt/log | 5-1 |
| Virus Check State | Communication Packet (Header) | Container | Paccheck | prog/comchck | 6-1 |
| | File | Container | Filecheck | prog/vircheck | 6-2 |
| | Main Device | Container | devcheck | prog/devcheck | 6-3 |
| Measure to Counter Vulnerability | Acquire List of Installed Packages | Container | Pacget | mnt/pacget | 7-1 |
| | Update Installed Packages | Container | Pacup | mnt/pacup | 7-2 |
| User Notification of Event | | Container | alert | ver/alert | 8-1 |
| Behavior Detection | Activate EDR Software | Host | Edr | prog/edr | 9-1 |
| Protection of Stored Data | Encrypt Stored Data | Container | dataEnc | prog/enc | 10-1 |
| | Encrypt Disk | Host | diskEnc | vardislenc | 10-2 |
| Completeness Check | Data | Container | dataInt | var/dataInt | 11-1 |
| | Program | Container | proInt | var/progInt | 11-2 |
| | Firmware | Host | farInt | var/farInt | 11-3 |
| Set Container Resource | CPU | Host | Rescpu | dev/cpu | 12-1 |
| | Memory | Host | Resmem | dev/mem | 12-2 |

Figure 18:
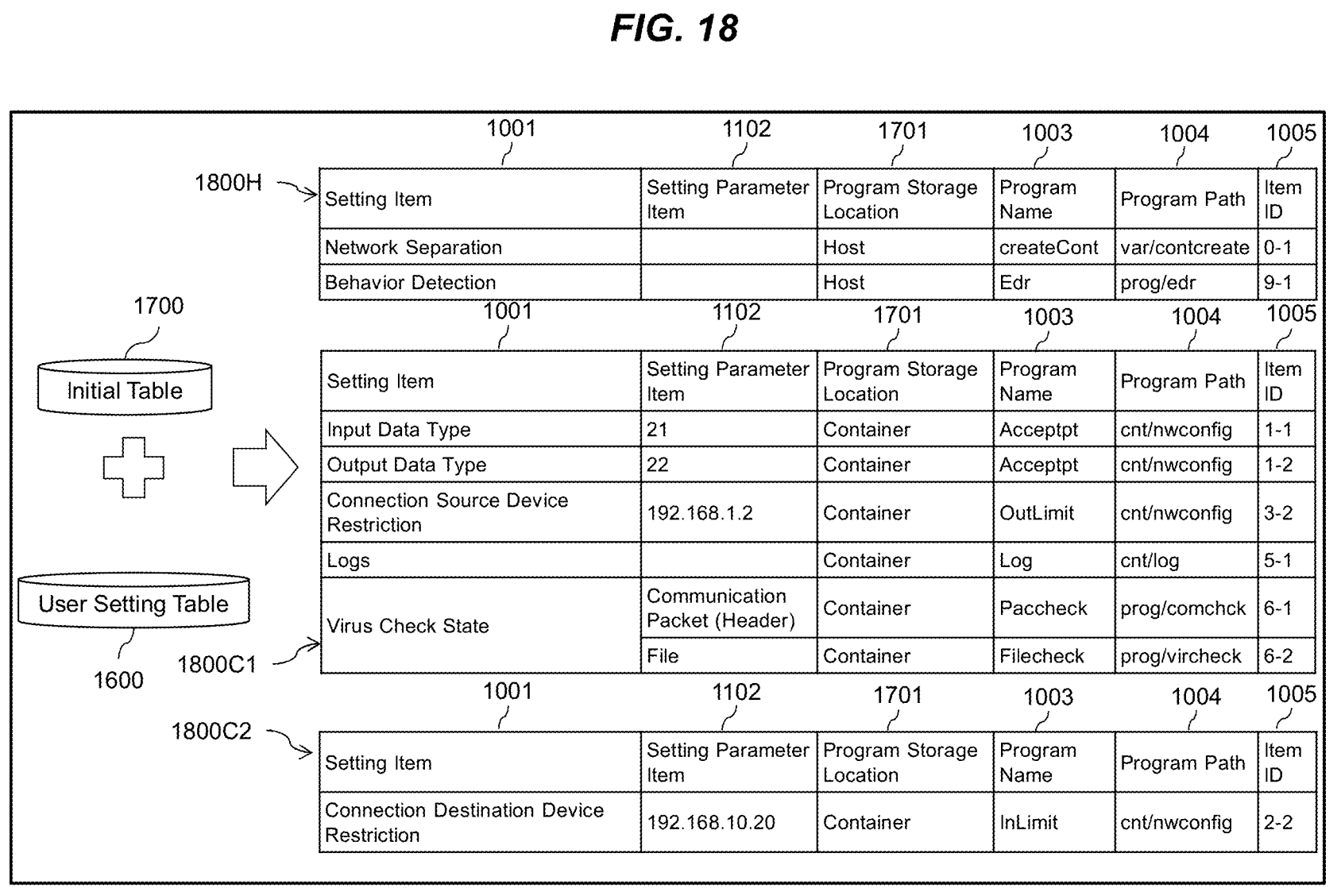

| Setting Item | Setting Parameter Item | Program Storage Location | Program Name | Program Path | Item ID |
|---|---|---|---|---|---|
| Network Separation | | Host | createCont | var/contcreate | 0-1 |
| Behavior Detection | | Host | Edr | prog/edr | 9-1 |

1800C1

| Setting Item | Setting Parameter Item | Program Storage Location | Program Name | Program Path | Item ID |
|---|---|---|---|---|---|
| Input Data Type | 21 | Container | Acceptpt | cnt/nwconfig | 1-1 |
| Output Data Type | 22 | Container | Acceptpt | cnt/nwconfig | 1-2 |
| Connection Source Device Restriction | 192.168.1.2 | Container | OutLimit | cnt/nwconfig | 3-2 |
| Logs | | Container | Log | cnt/log | 5-1 |
| Virus Check State | Communication Packet (Header) | Container | Paccheck | prog/comchck | 6-1 |
| | File | Container | Filecheck | prog/vircheck | 6-2 |

1800C2

| Setting Item | Setting Parameter Item | Program Storage Location | Program Name | Program Path | Item ID |
|---|---|---|---|---|---|
| Connection Destination Device Restriction | 192.168.10.20 | Container | InLimit | cnt/nwconfig | 2-2 |

FIG. 21

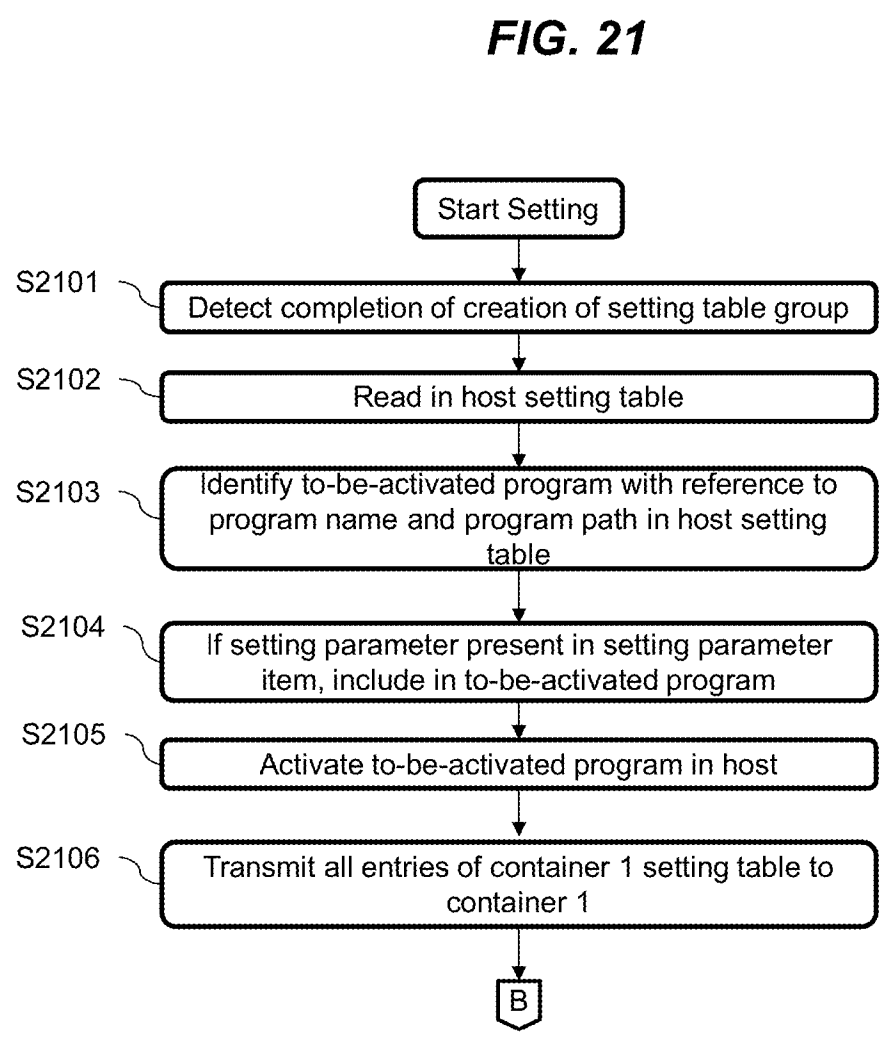

Start Setting

S2101 Detect completion of creation of setting table group

S2102 Read in host setting table

S2103 Identify to-be-activated program with reference to program name and program path in host setting table S2104 If setting parameter present in setting parameter item, include in to-be-activated program S2105 Activate to-be-activated program in host S2106 Transmit all entries of container 1 setting table to container 1

Figure 23:
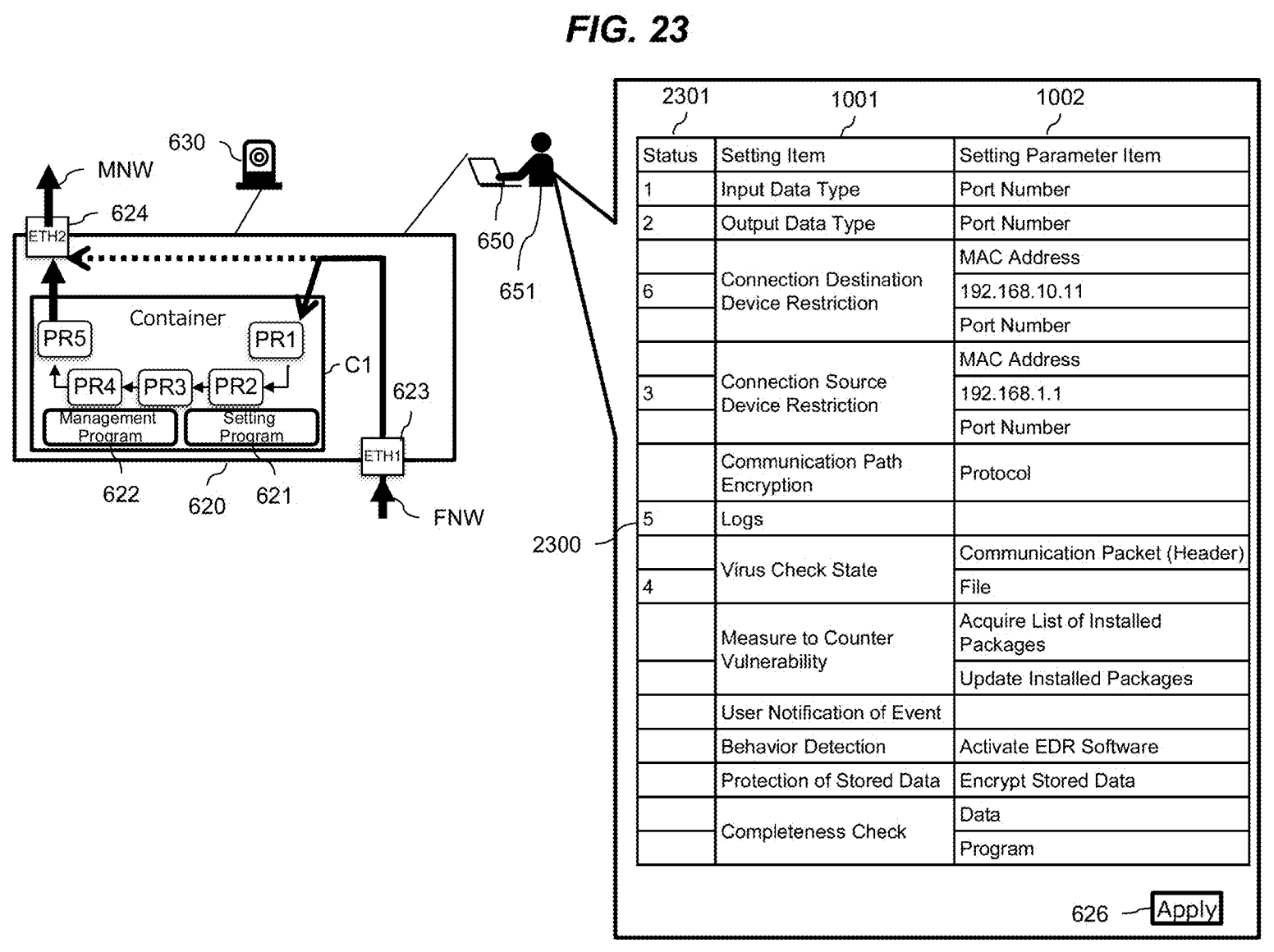

| Status | Setting Item | Setting Parameter Item |
|---|---|---|
| 1 | Input Data Type | Port Number |
| 2 | Output Data Type | Port Number |
| | Connection Destination Device Restriction | MAC Address |
| 6 | | 192.168.10.11 |
| | | Port Number |
| | Connection Source Device Restriction | MAC Address |
| 3 | | 192.168.1.1 |
| | | Port Number |
| | Communication Path Encryption | Protocol |
| 5 | Logs | |
| | Virus Check State | Communication Packet (Header) |
| 4 | | File |
| | Measure to Counter Vulnerability | Acquire List of Installed Packages |
| | | Update Installed Packages |
| | User Notification of Event | |
| | Behavior Detection | Activate EDR Software |
| | Protection of Stored Data | Encrypt Stored Data |
| | Completeness Check | Data |
| | | Program |

FIG. 24

2400 User Setting Table 2301 1001 1002 1005

| Status | Setting Item | Setting Parameter Item | Item ID |
|---|---|---|---|
| 1 | Input Data Type | Port Number | 1-1 |
| 2 | Output Data Type | Port Number | 1-2 |
|  | Connection Destination Device Restriction | MAC Address | 2-1 |
| 6 |  | 192.168.10.11 | 2-2 |
|  |  | Port Number | 2-3 |
|  | Connection Source Device Restriction | MAC Address | 3-1 |
| 3 |  | 192.168.1.1 | 3-2 |
|  |  | Port Number | 3-3 |
|  | Communication Path Encryption | Protocol | 4-1 |
| 5 | Logs |  | 5-1 |
|  | Virus Check State | Communication Packet (Header) | 6-1 |
| 4 |  | File | 6-2 |
|  | Measure to Counter Vulnerability | Acquire List of Installed Packages | 7-1 |
|  |  | Update Installed Packages | 7-2 |
|  | User Notification of Event |  | 8-1 |
|  | Behavior Detection | Activate EDR Software | 9-1 |
|  | Protection of Stored Data | Encrypt Stored Data | 10-1 |
|  | Completeness Check | Data | 11-1 |
|  |  | Program | 11-2 |

FIG. 25
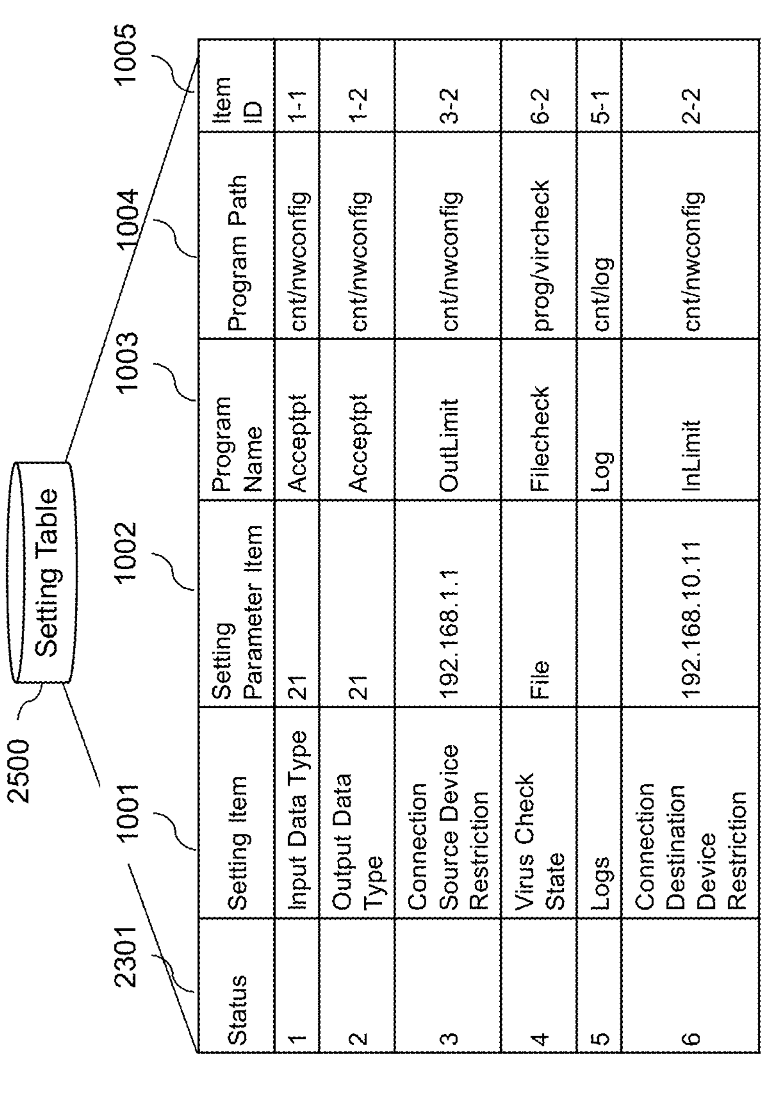
| Status | Setting Item | Setting Parameter Item | Program Name | Program Path | Item ID |
|---|---|---|---|---|---|
| 1 | Input Data Type | 21 | Acceptpt | cnt/nwconfig | 1-1 |
| 2 | Output Data Type | 21 | Acceptpt | cnt/nwconfig | 1-2 |
| 3 | Connection Source Device Restriction | 192.168.1.1 | OutLimit | cnt/nwconfig | 3-2 |
| 4 | Virus Check State | File | Filecheck | prog/vircheck | 6-2 |
| 5 | Logs | | Log | cnt/log | 5-1 |
| 6 | Connection Destination Device Restriction | 192.168.10.11 | InLimit | cnt/nwconfig | 2-2 |
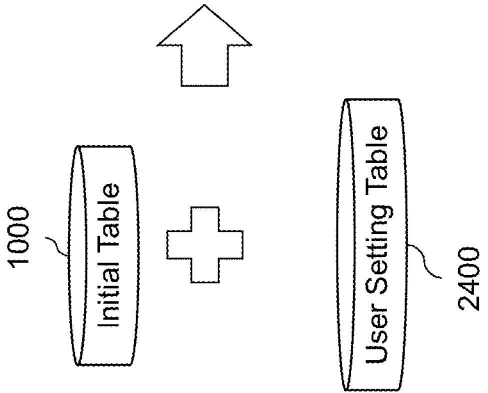

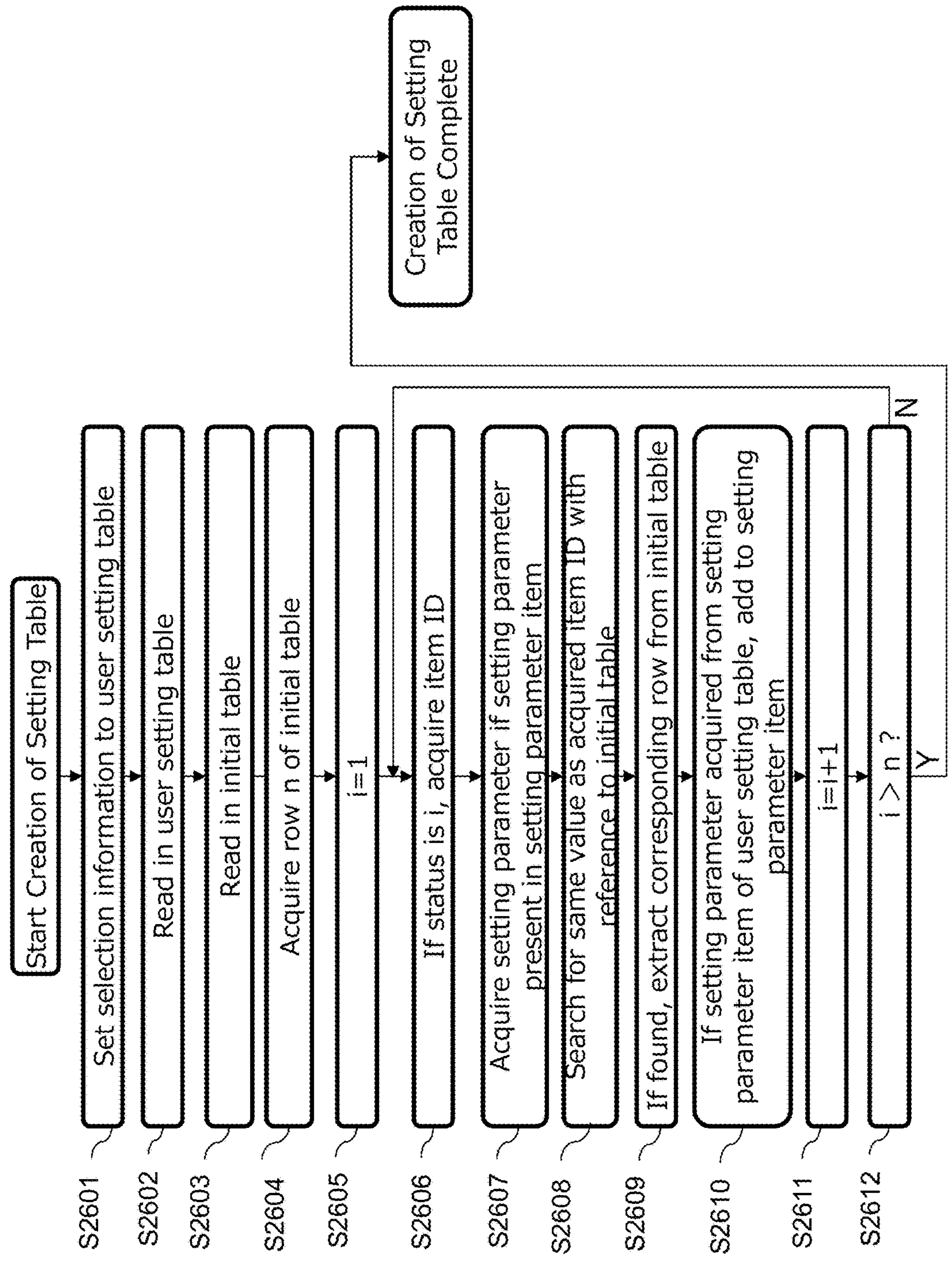
FIG. 26
Start Creation of Setting Table
S2601
Set selection information to user setting table
S2602
Read in user setting table
S2603
Read in initial table
S2604
Acquire row n of initial table
S2605
i=1
S2606
If status is i, acquire item ID
S2607
Acquire setting parameter if setting parameter present in setting parameter item
S2608
Search for same value as acquired item ID with reference to initial table
S2609
If found, extract corresponding row from initial table
S2610
If setting parameter acquired from setting parameter item of user setting table, add to setting parameter item
S2611
i=i+1
S2612
i > n ?
Y
N
Creation of Setting Table Complete

FIG. 28

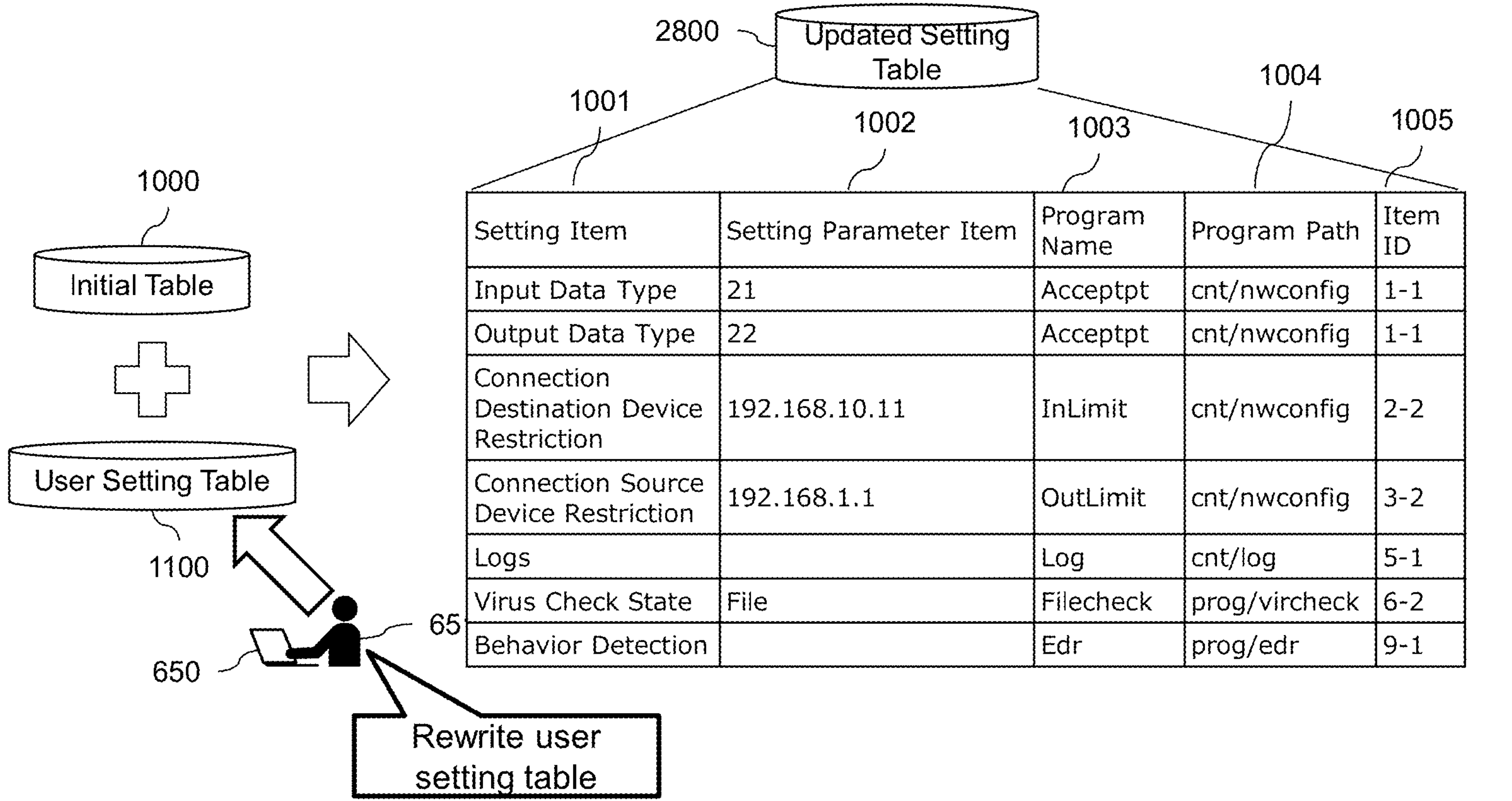

| Setting Item | Setting Parameter Item | Program Name | Program Path | Item ID |
| --- | --- | --- | --- | --- |
| Input Data Type | 21 | Acceptpt | cnt/nwconfig | 1-1 |
| Output Data Type | 22 | Acceptpt | cnt/nwconfig | 1-1 |
| Connection Destination Device Restriction | 192.168.10.11 | InLimit | cnt/nwconfig | 2-2 |
| Connection Source Device Restriction | 192.168.1.1 | OutLimit | cnt/nwconfig | 3-2 |
| Logs | | Log | cnt/log | 5-1 |
| Virus Check State | File | Filecheck | prog/vircheck | 6-2 |
| Behavior Detection | | Edr | prog/edr | 9-1 |

*FIG. 29*

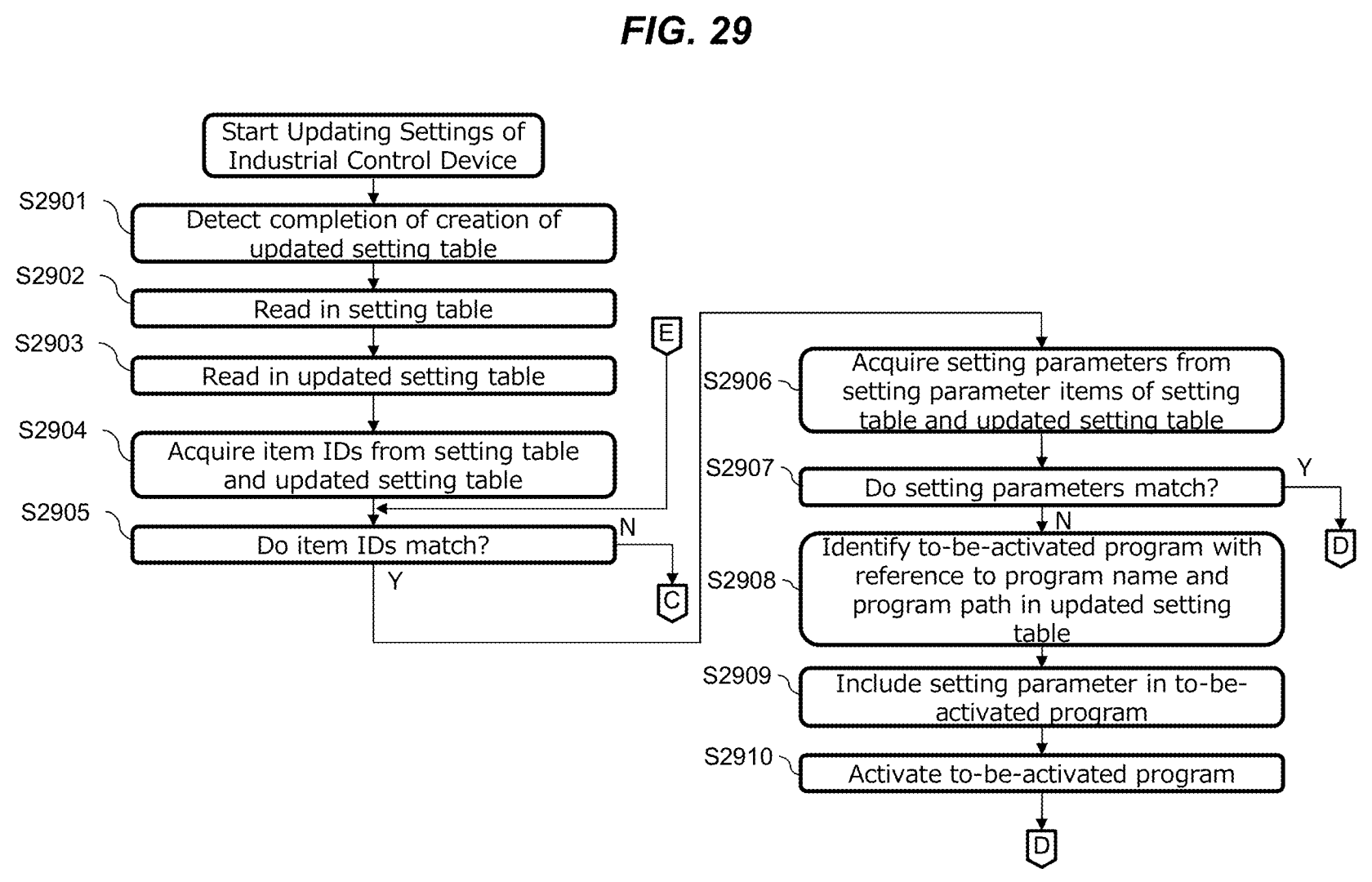

Start Updating Settings of Industrial Control Device

S2901 Detect completion of creation of updated setting table

S2902 Read in setting table

S2903 Read in updated setting table

E

S2904 Acquire item IDs from setting table and updated setting table

S2905 Do item IDs match?

N → C

Y

S2906 Acquire setting parameters from setting parameter items of setting table and updated setting table S2907 Do setting parameters match?

Y → D

N

S2908 Identify to-be-activated program with reference to program name and program path in updated setting table S2909 Include setting parameter in to-be-activated program S2910 Activate to-be-activated program

D

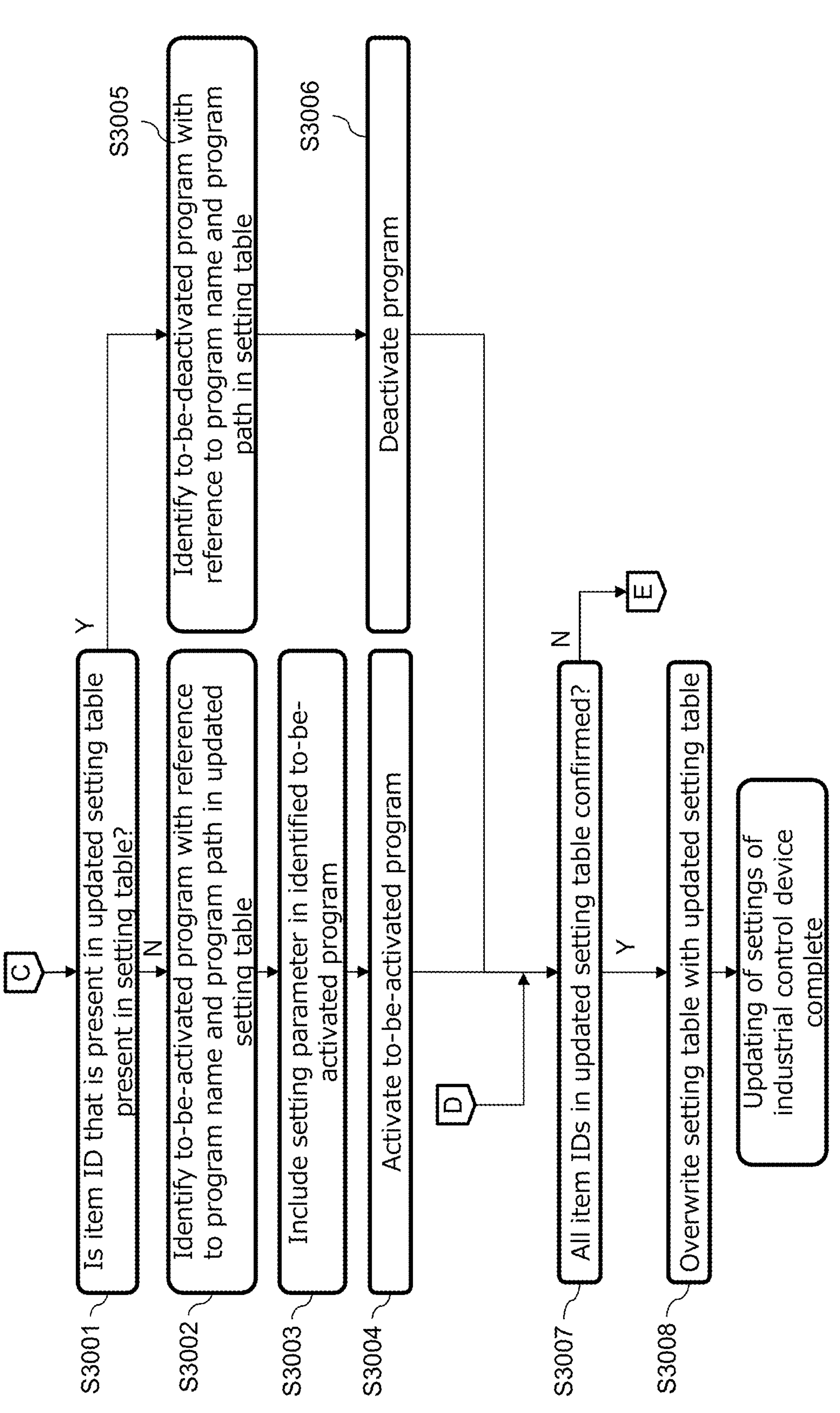
FIG. 30
C
Is item ID that is present in updated setting table present in setting table?
S3001
Y
N
Identify to-be-deactivated program with reference to program name and program path in setting table
S3005
Deactivate program
S3006
Identify to-be-activated program with reference to program name and program path in updated setting table
S3002
Include setting parameter in identified to-be-activated program
S3003
Activate to-be-activated program
S3004
D
All item IDs in updated setting table confirmed?
S3007
N
E
Y
Overwrite setting table with updated setting table
S3008
Updating of settings of industrial control device complete

| Error Code | Content |
| --- | --- |
| E001 | Data received from device with unauthorized IP address |
| E002 | Data received from device with unauthorized MAC address |
| E003 | Data received by unauthorized protocol |
| E004 | Virus detected in data |
| E005 | Unauthorized action detected |
| E006 | Transmission data to unauthorized IP address detected |
| : | : |

TRANSFER DEVICE AND TRANSFER METHOD FOR DATA TRANSFER COMPATIBLE WITH A PLURALITY OF PROTOCOLS

CLAIM OF PRIORITY

The present application claims priority from Japanese patent application No. 2022-48121 filed on Mar. 24, 2022, the content of which is hereby incorporated by reference into this application.

TECHNICAL FIELD

The present invention relates to a transfer device and a transfer method by which data is transferred.

BACKGROUND ART

Digital transformation (DX) of factories, in which various data is collected from factory sites by management divisions, analyzed, and fed back, is being promoted in order to improve productivity and product quality. In factories, devices are individually installed for each production line and department (manufacturing, quality assurance, etc.), and the devices have various data. In order to realize DX of factories, it is necessary to collect the various data of the devices at the factory sites.

Meanwhile, networks and connection requirements differ between the factory sites and management divisions, which makes it difficult for the data throughout the factories to be seamlessly collected by the management divisions. Also, factories have legacy devices and systems with expired support in operation, and it is difficult to make any structural changes at the factory sites to alleviate this situation without interfering with day-to-day operations.

Patent Document 1 discloses a communication control device installed between a home network and a QoS-controllable external network in a streaming-type content distribution service using Real-Time Streaming Protocol (RTSP). The communication control device has: a message acquisition unit that acquires RTSP messages transmitted and received between an RTSP client device and an RTSP server device; a QoS control information generation unit that acquires information necessary for QoS control from the RTSP messages acquired by the message acquisition unit; and a QoS control unit that establishes a QoS session for transferring video to and from the RTSP server device according to the information necessary for QoS control acquired by the QoS control information generation unit.

RELATED ART DOCUMENTS

Patent Documents

Patent Document 1: JP 2009-118361 A

SUMMARY OF THE INVENTION

Problems to be Solved by the Invention

However, in the above-mentioned conventional technique, RTSP is specialized and there is no consideration made for various protocols. Thus, if the network in which a transmission source device that transmits the data is disposed differs in protocol from a destination device storing the data from the transmission source device, then the destination device cannot acquire the data from the transmission source device.

An object of the present invention is to realize data transfer compatible with any of a plurality of protocols.

Means for Solving the Problems

An aspect of disclosed invention in the present application is a transfer device that receives data from a transmission source device, executes a process on the data, and transmits the data on which the process was executed to a destination device, a processor that executes a program group; and a storage device that stores the program group and initial setting information, the transfer device comprising:

wherein each program in the program group matches a reception protocol pertaining to reception of the data from the transmission source device, a processing protocol pertaining to the process, or a transmission protocol pertaining to transmission of the data to the destination device, wherein the initial setting information defines designation information that designates, for each protocol, the program matching the protocol, and wherein the processor executes:

a reception process of receiving input of a first setting parameter to a first program that matches the reception protocol and the transmission protocol;

an acquisition process of acquiring first designation information for designating the first program with reference to the initial setting information; and an activation process of activating the first program using the first designation information and the first setting parameter.

Effects of the Invention

According to a representative embodiment of the present invention, it is possible to realize data transfer compatible with any of a plurality of protocols. Other objects, configurations, and effects than those described above are clarified by the following description of an embodiment.

BRIEF DESCRIPTION OF THE DRAWINGS

FIG. 1 is a descriptive view showing example 1 of protocols.

FIG. 2 is a descriptive view showing example 2 of protocols.

FIG. 3 is a descriptive view showing example 3 of protocols.

FIG. 4 is a descriptive view showing example 4 of protocols.

FIG. 6 is a descriptive view showing a system configuration example of a transfer system.

FIG. 10 is a descriptive view showing an example of an initial table. An initial table 1000 is list information of protocols that can be applied to the management network MNW, and each industrial control device has the initial table.

FIG. 11 is a descriptive view showing an example of a user setting table.

FIG. 12 is a descriptive view showing an example of creation of a setting table.

FIG. 16 is a descriptive drawing showing an example of a user setting table according to Embodiment 2.

FIG. 17 is a descriptive drawing showing an example of an initial table according to Embodiment 2.

FIG. 18 is a descriptive view showing an example of creation of a setting table according to Embodiment 2.

FIG. 21 is a flowchart 1 showing an example of setting process steps for the industrial control device according to Embodiment 2.

FIG. 23 is a descriptive drawing showing one example of setting information according to Embodiment 3.

FIG. 24 is a descriptive drawing showing an example of a user setting table according to Embodiment 3.

FIG. 25 is a descriptive view showing an example of creation of a setting table according to Embodiment 3.

FIG. 26 is a flowchart showing an example of steps of the creation process for the setting table according to Embodiment 3.

FIG. 28 is a descriptive view showing an example of updating a setting table according to Embodiment 5.

FIG. 29 is a flowchart 1 showing an example of setting process steps for the industrial control device according to Embodiment 5.

FIG. 30 is a flowchart 2 showing an example of setting process steps for the industrial control device according to Embodiment 5.

DETAILED DESCRIPTION OF EMBODIMENTS

<Protocols>

A "protocol" typically refers to procedures and standards for communication between computers, and in this specification, refers to procedures and standards for outputting data that has been inputted, according to reception, processing, and transmission procedures. Specifically, protocols in this specification are divided into protocols for receiving data (reception protocols), protocols for executing a process on the basis of the received data (processing protocols), and protocols for transmitting received or processed data (transmission protocols), for example. Below, a specific example will be shown with reference to FIGS. 1 to 5.

FIGS. 1 to 4 are descriptive views showing examples of protocols. Each row in the tables shown in FIGS. 1 to 4 is a protocol. A protocol category 101 indicates whether each protocol is a reception protocol, a processing protocol, or a transmission protocol described above, and "o" indicates the category to which the protocol belongs.

A classification 102 indicates the type of each protocol. A detailed item 103 indicates a detailed item of each protocol. There are one or more detailed items 103 for each protocol. A setting example 104 to be set by a user indicates an example of a set value as inputted by a user for each protocol.

Figures 5A, 5B:
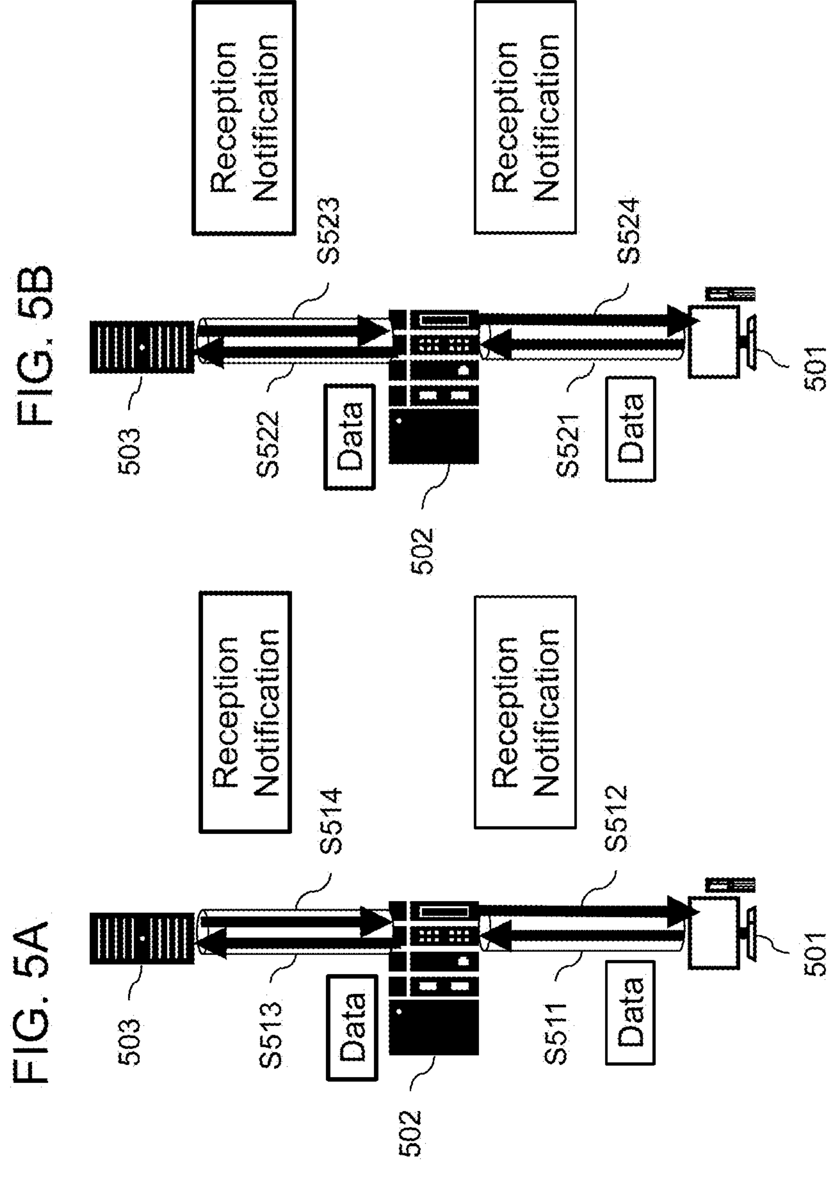
FIGS. 5A and 5B are descriptive views showing data transmission examples.

FIGS. 5A and 5B are descriptive views showing a data transmission example. FIGS. 5A and 5B are examples of data transmission from a transmission source device 501 to a destination device 503, and specifically, is an example in which a transfer device 502 sets a protocol required by the destination device 503 to data inputted according to a protocol of the transmission source device 501 and then transmits the data between the transmission source device 501 and the destination device 503.

Here, "data" refers to both streaming format data such as setting values or measurement values measured by the transmission source device 501 and file format data such as inspection result files. Data transmission includes two types, described below.

With reference to FIG. 5A, the transmission source device 501 transmits data to the destination device 503, the transfer device 502 receives data from the transmission source device 501 (step S511), and a data reception notification is returned to the transmission source device 501 in advance of the data being transferred to the destination device 503 (step S512). Then, the transfer device 502 transmits the data to the destination device 503 (step S513), and receives a reception notification from the destination device 503 (step S514).

With reference to FIG. 5B, the transmission source device 501 transmits data to the destination device 503, the transfer device 502 receives data from the transmission source device 501 (step S521), and transfers the data to the destination device 503 (step S522). The destination device 503 returns a reception notification to the transfer device 502 (step S523), and after receiving the reception notification, the transfer device 502 returns the data reception notification to the transmission source device 501 (step S524).

Next, a transfer system will be described with reference to FIG. 6, etc. In the description below, a "program" is defined as processes executed by a processor 801, and for ease of description, a situation in which processes of a program are executed by the processor 801 is sometimes described as processes being performed by the program.

Embodiment 1

<System Configuration Example>

FIG. 6 is a descriptive view showing a system configuration example of a transfer system. A transfer system 600 has data-collected systems 610-1 and 610-2 disposed at sites F1 and F2, industrial control devices 620-1 and 620-2, warning devices 630-1 and 630-2, and a data storage device 640. The sub-number indicates the numerical label of the sites F1 and F2. This similarly applies to other sub-numbers in reference characters below. If not distinguishing between the sites F1 and F2, the sites are collectively referred to as the sites F.

In FIG. 6, there are two data-collected systems 610-1 and 610-2, but the number of data-collected systems may be one, or three or more. If not distinguishing between the data-collected systems 610-1 and 610-2, the sub-numbers are omitted, and the data-collected systems are simply referred to as the data-collected systems 610. The data-collected system 610 is the transmission source device 501 shown in FIGS. 5A and 5B.

The data-collected systems 610-1 and 610-2 are respectively disposed at the sites F1 and F2. The data-collected systems 610-1 and 610-2 respectively have test devices 611-1 and 611-2, assembly devices 612-1 and 612-2, and instruction devices 613-1 and 613-2, for example.

The test devices 611-1 and 611-2 are computers that execute tests at the respective sites F1 and F2. The assembly devices 612-1 and 612-2 are machine tools that execute assembly work at the respective sites F1 and F2. The instruction devices 613-1 and 613-2 are computers that transmit instructions to the assembly devices 612-1 and 612-2 at the sites F1 and F2 to control the assembly devices 612-1 and 612-2. If not distinguishing, respectively, between the test devices 611-1 and 611-2, between the assembly devices 612-1 and 612-2, and between the instruction devices 613-1 and 613-2, the sub-numbers are omitted and the devices are referred to simply as the test devices 611, the assembly devices 612, and the instruction devices 613.

The industrial control devices 620-1 and 620-2 respectively acquire data from the data-collected systems 610-1 and 610-2 and transfer the data to the data storage device 640. If not distinguishing between the industrial control devices 620-1 and 620-2, the sub-numbers are omitted, and the industrial control devices are simply referred to as the industrial control devices 620. The industrial control device 620 is the transfer device 502 shown in FIGS. 5A and 5B. The industrial control devices 620 are disposed within or outside of the sites F. Also, the industrial control devices 620 are connected to a terminal 650 of a user 651 in a manner enabling communication therewith using a network (not shown).

The internal configuration of the industrial control devices 620 will described with the industrial control device 620-1 as an example. The industrial control device 620-1 has a setting program 621-1, a management program 622-1, a reception port 623-1, and a transmission port 624-1. If not distinguishing between the sites F1 and F2, the sub-numbers are omitted and the foregoing are referred to simply as the setting program 621, the management program 622, the reception port 623, and the transmission port 624.

The setting program 621-1 and the management program 622-1 are installed in a container C1-1. The container C1-1 has installed therein programs PR1 to PR5. In this case, the number of programs is five, but this is merely one example, and the number of programs may be four or less, or six or more. If not distinguishing between the programs PR1 to PR5, the programs are simply referred to as the programs PR. The setting program 621-1 is a program for setting each of the programs PR1 to PR5 to be executable or non-executable. The management program 622-1 is a program for detecting an error and controlling the operation of the warning device 630-1. The programs PR1 to PR5 are subject to the settings of the setting program 621-1, the data received at the reception port 623-1 is processed by an activated program PR, and the processed data is transmitted from the transmission port 624-1. Activation signifies setting the program PR to be executable, and specifically refers to activating the functions of the program PR, for example.

The industrial control device 620-1 and the data-collected system 610-1 are connected to each other via a site network FNW1 so as to be able to communicate with each other, and the industrial control device 620-2 and the data-collected system 610-2 are connected to each other via a site network FNW2 so as to be able to communicate with each other. If not distinguishing between the site networks FNW1 and FNW2, then the site networks are simply referred to as the site networks FNW. The site network FNW is a network that can communicate by FTP (File Transfer Protocol), for example.

The warning devices 630-1 and 630-2 are respectively connected to the industrial control devices 620-1 and 620-2, and issue an error notification if an error is detected in the industrial control devices 620-1 and 620-2. If not distinguishing between the warning devices 630-1 and 630-2, the sub-numbers are omitted, and the warning devices are simply referred to as the warning devices 630.

The data storage device 640 is connected so as to be able to communicate with the industrial control device 620 and stores data from the industrial control device 620. The data storage device 640 is the destination device 503 shown in FIGS. 5A and 5B. The data storage device 640 and the industrial control device 620 are connected via a management network MNW so as to be able to communicate with each other. The management network MNW is a network that can communicate by SFTP (SSH File Transfer Protocol), for example.

<Operation Example of Transfer System 600>

Next, an operation example 1 of the transfer system 600 will be described with reference to FIG. 6, with the site F1 as an example. The industrial control device 620-1 stores, in the container C1-1, a setting item that can be set as a protocol for the management network MNW and the programs PR.

[S601]

The user 651 refers to user-settable information 625-1 to select a setting item required by the protocol of the management network MNW to which the data storage device 640 is connected, and activates the program PR thereof. Also, the user 651 inputs setting parameters for the setting item. For example, if the setting item is “input data type,” then the setting parameter is a port number, and if the setting item is a “connection destination device limit,” then the setting parameter is the MAC address, the IP address, or the port number of the data storage device 640. The row in which a check mark is placed is an activated setting item. The user-settable information 625-1 is a classification 102 settable by the user 651.

[S602]

If the user 651 presses an apply button 626-1, the industrial control device 620-1 reads in the user-settable information 625-1, activates programs PR that can execute settings of setting items having a check mark, and includes setting parameters inputted by the user 651 for the setting items in the program PR. In FIG. 6, the programs PR1, PR2, PR4, and PR5 are activated.

[S603]

The industrial control device 620-1 receives data from the test device 611-1 at the reception port 623-1 and outputs the data to the container C1-1.

[S604]

The industrial control device 620-1 executes the programs PR1, PR2, PR4, and PR5 on the received data. If the protocol category 101 of the program PR is “reception” or "transmission," then the program PR is executed prior to the reception of the data, and if the protocol category 101 of the program PR is "processing," then the program PR is executed when the data is received.

If, for example, the program PR1 is a program that executes a "data type" for which the protocol category 101 is "reception," then the program PR1 sets the reception port 623-1, corresponding to the port number 21 that is the setting parameter, to be able to receive data. Also, if the program PR2 is a program that executes "log acquisition" for which the protocol category 101 is "processing," for example, then the program PR2 acquires logs such as the reception date/time and 5-tuple for data received at the reception port 623-1.

[S605]

The industrial control device 620-1 transmits output data processed by the programs PR1, PR2, PR4, and PR5 to the data storage device 640 that is the destination device 503 via the transmission port 624-1. The industrial control device 620-1 can include the processing results of the programs PR1, PR2, PR4, and PR5 in the output data.

In this manner, the industrial control device 620 intercepts the data transmitted to the data storage device 640 from the data-collected system 610, executes the processes matching the protocols according to the setting items set with check boxes by the user 651 using the programs PR1, PR2, PR4, and PR5, and transmits the processed output data to the data storage device 640. The setting item is a character string (protocol name) indicating the type of protocol, and corresponds to the above-mentioned classification 102.

Figure 7:
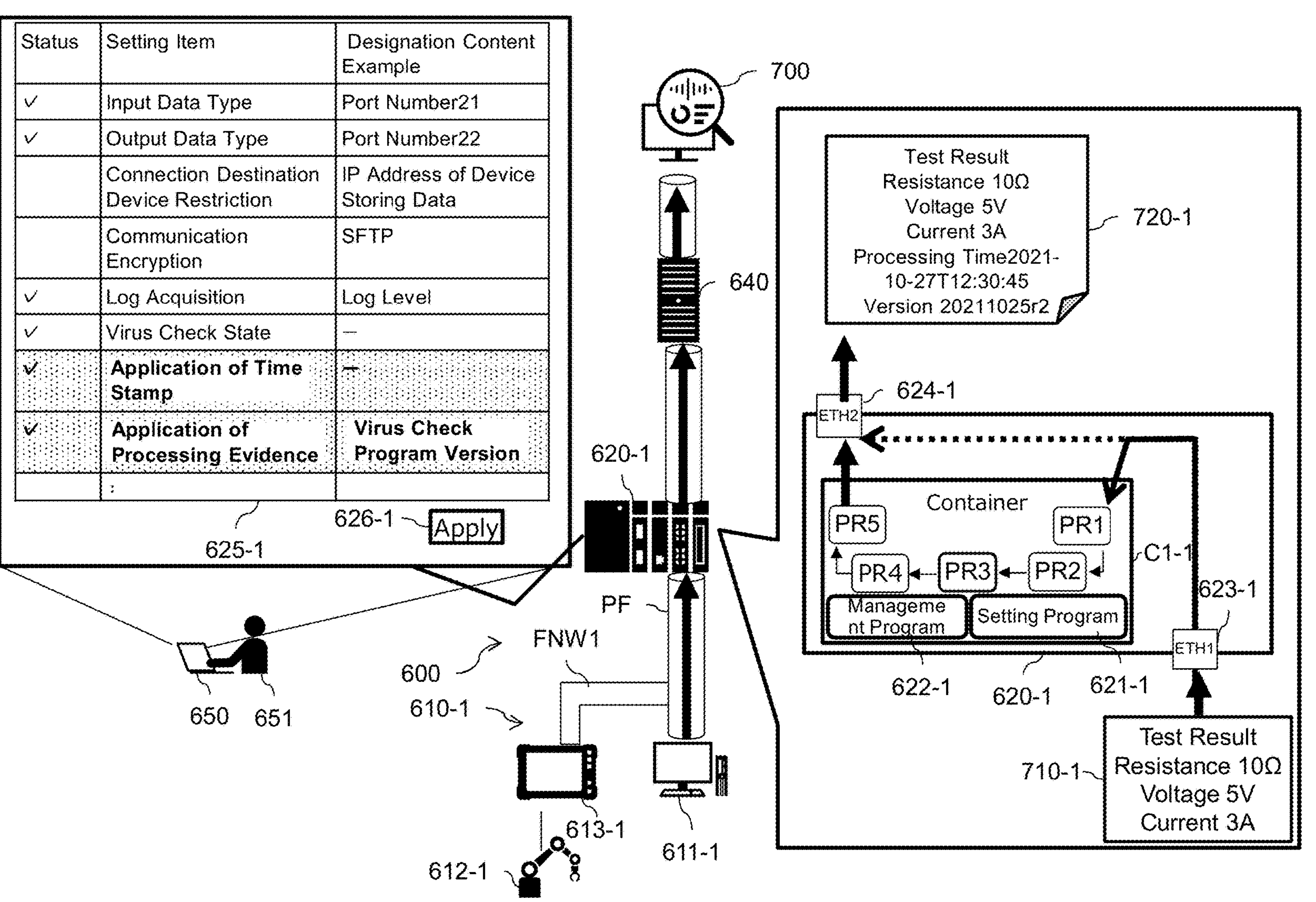
FIG. 7 is a descriptive view showing an operation example 2 of the transfer system 600.

FIG. 7 is a descriptive view showing an operation example 2 of the transfer system 600. In FIG. 7 the data storage device 640 is connected to an analysis device 700 in a manner enabling communication therewith. In this example, the activated program PR1 pertains to the setting item "input data type," the activated program PR2 pertains to the setting item "virus check," the activated program PR3 pertains to the setting item "apply time stamp," the activated program PR4 pertains to the setting item "apply processing evidence," and the activated program PR5 pertains to the setting item "output data type."

In this case, the industrial control device 620 uses the program PR1 to set the port number of the reception port 623-1 that receives data from the test device 611-1 to "21," which enables reception by FTP, and uses the program PR5 to set the port number of the transmission port 624-1 that transmits output data to "22," which enables transmission by SFTP. As a result, the data 710-1 can be received from the test device 611-1 via the site network FNW1, and the output data 720-1 can be transmitted to the data storage device 640 via the management network MNW.

After setting the respective port numbers to "21" and "22," upon receiving from the test device 611-1 the data 710-1 at the reception port 623-1 with the port number of "21" via the site network FNW1, the industrial control device 620 uses the program PR2 to execute a virus check on the received data 710-1, uses the program PR3 to add the processing time at which the virus check was executed to the data 710-1 as information derived from the industrial control device 620-1, and uses the program PR4 to add the version of the virus check program PR3 to the data 710-1 as information derived from the industrial control device 620-1, and sets the data 710-1 processed in the foregoing manner as the output data 720-1.

The industrial control device 620 transmits, to the data storage device 640, the output data 720-1 from the transmission port 624-1 with the port number of "22" via the management network MNW. The data storage device 640, which has received the output data 720-1, transmits the output data 720-1 to the analysis device 700. As a result, the output data 720-1 is actively used in analysis by the analysis device 700.

<Computer Hardware Configuration Example>

Next, a hardware configuration example of the computer (test device 611, instruction device 613, industrial control device 620, data storage device 640, terminal 650, analysis device 700) will be described.

<Hardware Configuration Example of Computer>

Figure 8:
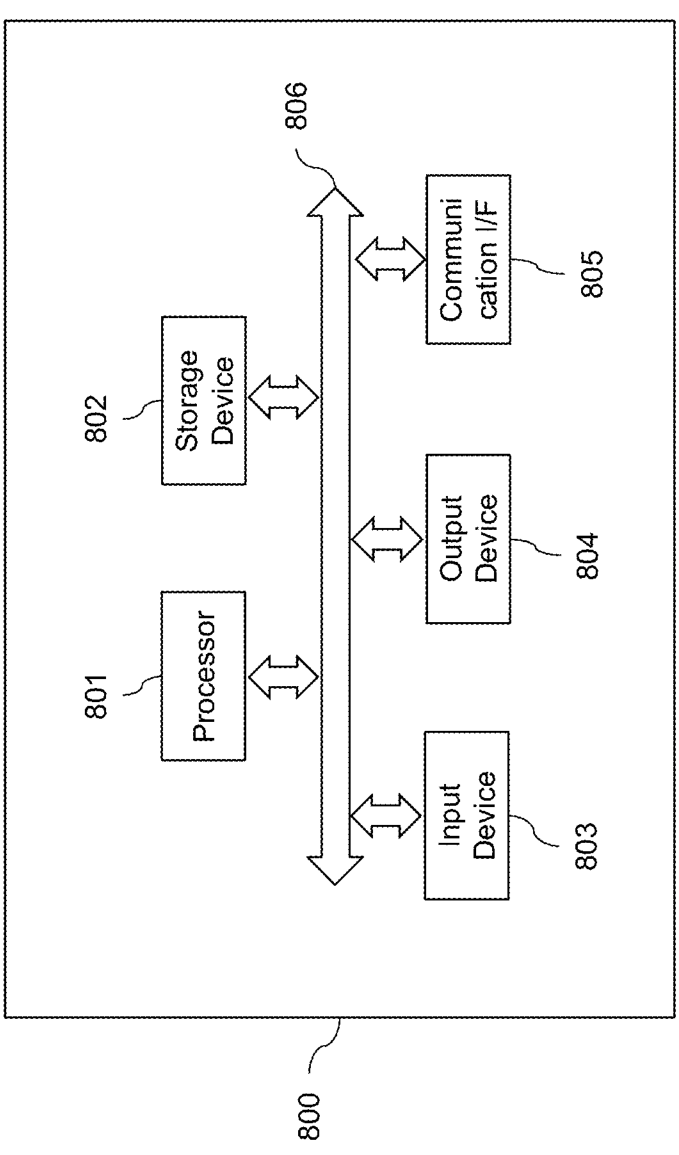
FIG. 8 is a block diagram for illustrating a hardware configuration example of the computer.

FIG. 8 is a block diagram for illustrating a hardware configuration example of the computer. A computer 800 includes a processor 801, a storage device 802, an input device 803, an output device 804, and a communication interface (communication IF) 805. The processor 801, the storage device 802, the input device 803, the output device 804, and the communication IF 805 are coupled to one another through a bus 806. The processor 801 is configured to control the computer 800. The storage device 802 serves as a work area for the processor 801. The storage device 802 is also a non-transitory or transitory recording medium configured to store various programs and various kinds of data. Examples of the storage device 802 include a read only memory (ROM), a random-access memory (RAM), a hard disk drive (HDD), and a flash memory. The input device 803 is configured to input data. Examples of the input device 803 include a keyboard, a mouse, a touch panel, a numeric keypad, a scanner, a microphone and a sensor. The output device 804 is configured to output data. Examples of the output device 804 include a display, a printer, and a speaker. The communication IF 805 is coupled to the network, and is configured to transmit and receive data.

<User Setting Screen Example>

Figure 9:
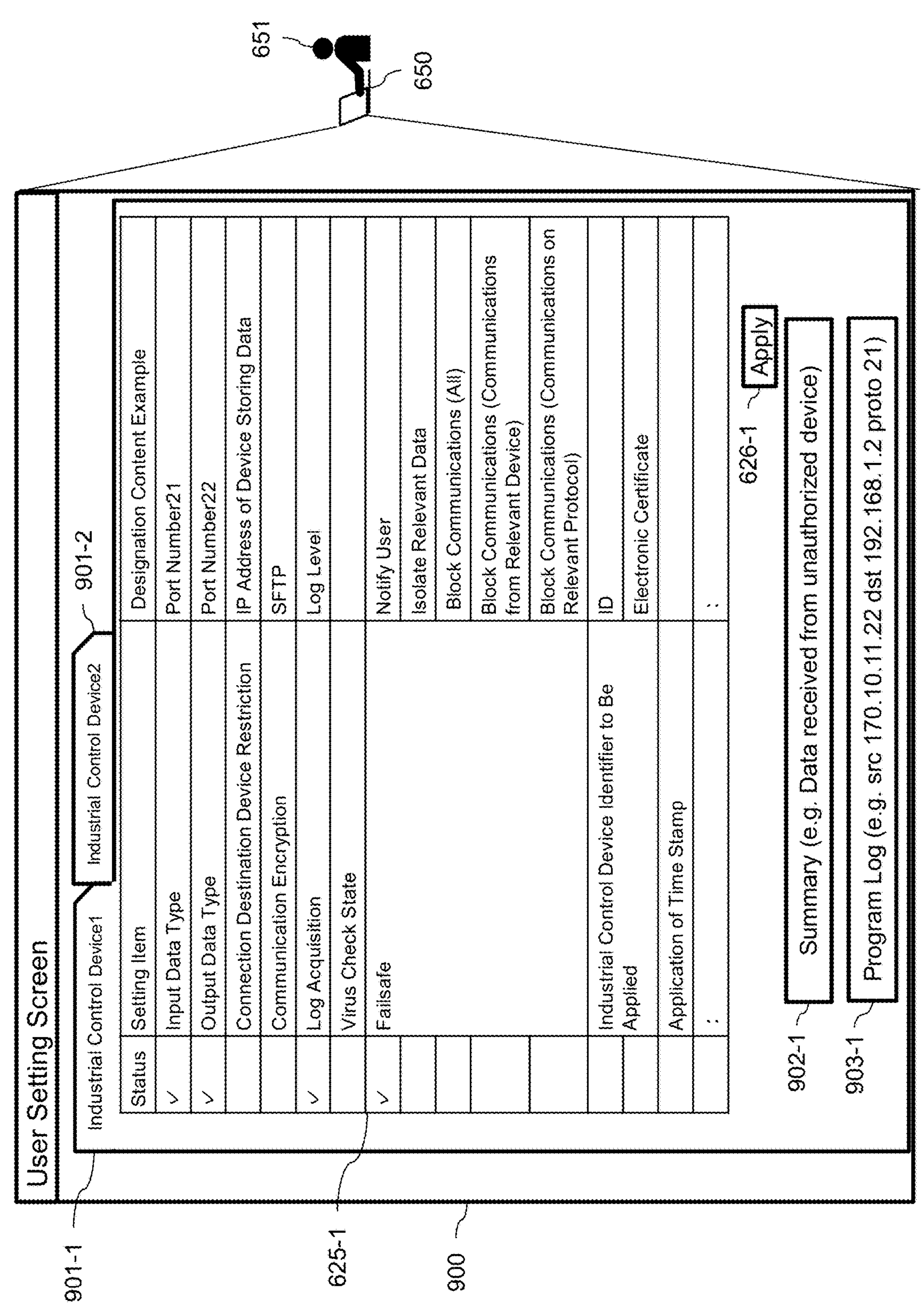
FIG. 9 is a descriptive view showing a user setting screen example displayed in the terminal 650.

FIG. 9 is a descriptive view showing a user setting screen example displayed in the terminal 650. A user setting screen 900 is displayed in a display, which is an example of an output device 804 of the terminal 650. The user setting screen 900 has tabs 901-1 and 901-2. If not distinguishing between tabs 901-1 and 901-2, the sub-numbers are omitted, and the tabs are simply referred to as the tabs 901.

The tab 901 is set for each site F. This example has the sites F1 and F2, and thus, the tab 901-1 corresponding to the site F1 and the tab 901-2 corresponding to the site F2 are set. The tab 901-1 pertains to the industrial control device 620-1 belonging to the site F1 (in FIG. 9, referred to as the "industrial control device 1") and the tab 901-2 pertains to the industrial control device 620-2 belonging to the site F2 (in FIG. 9, referred to as the "industrial control device 2").

FIG. 9 describes, using an example, a case in which the tab 901-1 is selected. The tab 901-1 displays settable information 625-1, an apply button 626-1, a summary 902-1, and a program log 903-1.

As described above, the user 651 can enter a check mark in statuses of the settable information 625-1, and can input setting parameters for the setting items.

The summary 902-1 displays content processed by the industrial control device 620-1 up to the time that the tab 901-1 was selected. The program log 903-1 displays logs of the executed program PR up to the time that the tab 901-1 was selected.

<Initial Table>

FIG. 10 is a descriptive view showing an example of an initial table. An initial table 1000 is list information of protocols that can be applied to the management network MNW, and each industrial control device 620 has the initial table. The initial table 1000 is stored in the terminal 650 or the industrial control device 620. The initial table 1000 may have differing content for each industrial control device 620. An example of the initial table 1000 will be described below.

The initial table 1000 has, as fields, a setting item 1001, a setting parameter item 1002, a program name 1003, a program path 1004, and an item ID 1005. The combination of values in the fields of each row constitutes an entry pertaining to one protocol.

The setting item 1001 indicates the protocol name selectable by the user 651 and corresponds to the classification 102. The setting parameter item 1002 indicates detailed content of the setting item 1001 and corresponds to the detailed item 103. The program name 1003 is the name of the program PR. The program path 1004 is information indicating the storage destination of the program PR in the industrial control device 620. The item ID 1005 is identification information that uniquely identifies the entry. The item ID 1005 is information in which sub-numbers uniquely identifying one or more setting parameter items 1002 in the same setting item 1001 are appended to a number uniquely identifying the setting item 1001.

<User Setting Table>

FIG. 11 is a descriptive view showing an example of a user setting table. A user setting table 1100 is list information that can set protocols that can be applied to the management network MNW, and each industrial control device 620 has the user setting table. The user setting table 1100 is stored in the industrial control device 620. The user setting table 1100 may have differing content for each industrial control device 620. An example of the user setting table 1100 will be described below.

The user setting table 1100 has, as fields, a status 1101, the setting item 1001, a setting parameter item 1102, and the item ID 1005. The status 1101 is a region indicating whether the protocol was selected by the user 651.

The setting parameter item 1102 is a region in which a setting parameter pertaining to the setting parameter item 1002 can be inputted. For example, the entry with an item ID 1005 of "2-2" has "192.168.10.11" inputted thereto as the IP address of the data storage device 640, and the entry with an item ID 1005 of "3-2" has "192.168.1.1" inputted thereto as the IP address of the data-collected system 610-1.

The user setting table 1100 is displayed in the user setting screen 900 of the terminal 650 as user-settable information 625. The item IDs 1005 of entries with check marks in the settable information 625 are transmitted as selection information to the industrial control device 620 as a result of pressing the apply button 626. The industrial control device 620 sets check marks to the statuses 1101 of the received item IDs 1005.

<Creation of Setting Table>

FIG. 12 is a descriptive view showing an example of creation of a setting table. The industrial control device 620 creates a setting table 1200 on the basis of the initial table 1000 and the user setting table 1100. Specifically, the setting table 1200 is created by overwriting, with the setting parameters of the setting parameter items 1102, the setting parameter items 1002 of the entries in the initial table 1000 corresponding to the item IDs 1005 of the entries in the user setting table 1100 for which the statuses 1101 have check marks, for example.

Figure 13:
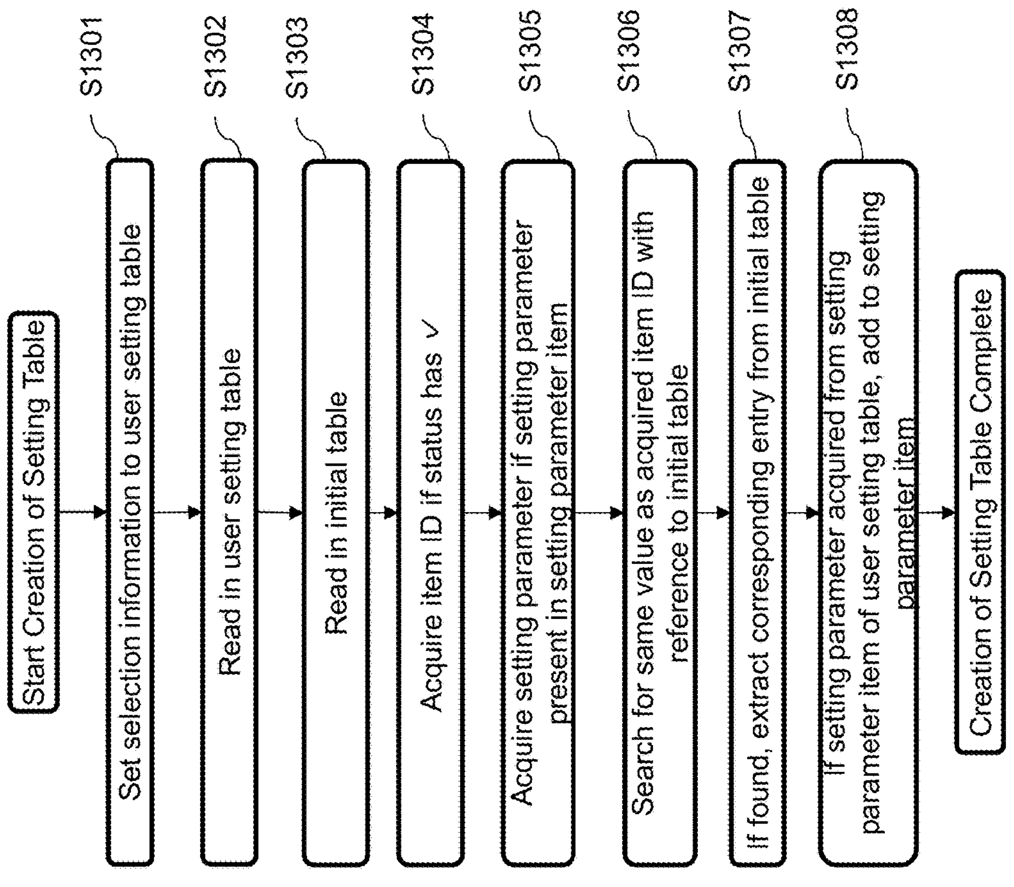
FIG. 13 is a flowchart showing an example of steps of the creation process for the setting table 1200.

FIG. 13 is a flowchart showing an example of steps of the creation process for the setting table 1200. The setting program 621 identifies the entry with the item ID 1005 of the user setting table 1100 that is the selection information from the terminal 650 and places a check mark in the status 1101 of the identified entry (step S1301).

The setting program 621 reads in the user setting table 1100 (step S1302). The setting program 621 reads in the initial table 1000 (step S1303). The setting program 621 acquires the item ID 1005 of the entry if the corresponding status 1101 of the user setting table 1100 has a check mark (step S1304).

The setting program 621 acquires the setting parameter if the setting parameter has been inputted to the setting parameter item 1102 of the user setting table 1100 (step S1305). The setting program 621 refers to the initial table 1000 and searches for the same value as the item ID 1005 acquired in step S1304 among the item IDs 1005 of the initial table 1000 (step S1306).

If the same value as the item ID 1005 acquired in step S1304 is found among the item IDs 1005 of the initial table 1000, then the setting program 621 extracts the corresponding entry from the initial table 1000 (step S1307).

If a setting parameter is acquired from the setting parameter item 1102 of the user setting table 1100 in step S1305, then the setting program 621 adds the setting parameter to the setting parameter item 1002 and sets the same as the setting parameter item 1102 (step S1308). As a result, as shown in FIG. 12, the setting table 1200 is created.

<Setting Industrial Control Device 620>

Figure 14:
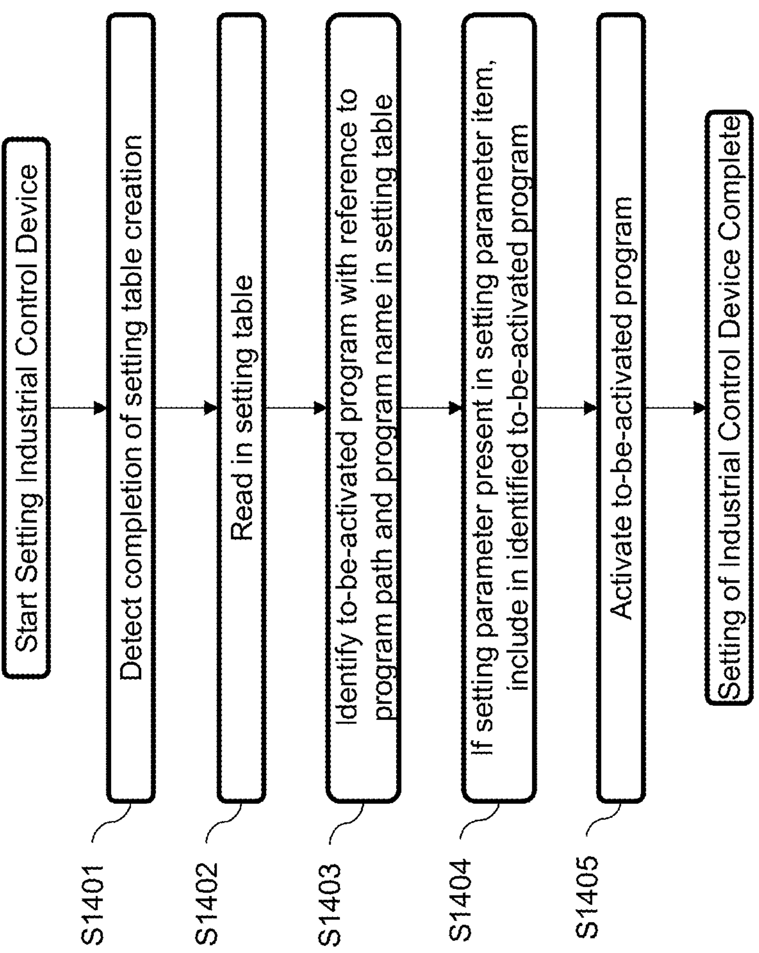
FIG. 14 is a flowchart showing an example of setting process steps for the industrial control device.

FIG. 14 is a flowchart showing an example of setting process steps for the industrial control device 620. The setting process for the industrial control device 620 is the process of step S602 shown in FIG. 6. The setting program 621 detects completion of creating the setting table 1200 (step S1401). The setting program 621 reads in the setting table 1200 (step S1402). The setting program 621 refers to the program name 1003 and the program path 1004 in the setting table 1200 and identifies a to-be-activated program PR (step S1403).

If the setting parameter is present in the setting parameter item 1102, the setting program 621 includes the setting parameter in the identified to-be-activated program PR (step S1404). The setting program 621 activates the identified to-be-activated program PR (step S1405). As a result, setting of the industrial control device 620 is completed.

When setting of the industrial control device 620 is completed, then as indicated in steps S603 to S605 of FIG. 6 and as shown in FIG. 7, data from the site network FNW is set so as to be compatible with the protocol of the management network MNW and collected in the data storage device 640.

Thus, according to Embodiment 1, the industrial control device 620 sets the data to be compatible with a given protocol. Therefore, even if the site network FNW in which a transmission source device 501 that transmits the data is disposed is a different management network MNW with a different protocol from the destination device 503 for the data, the destination device 503 can acquire the data from the transmission source device 501.

Embodiment 2

Next, Embodiment 2 will be described. In Embodiment 1, an example was described in which one container C1-1 is installed in the industrial control device 620-1. In Embodiment 2, an example will be described in which a plurality of containers are installed in the industrial control device 620. In Embodiment 2, differences from Embodiment 1 will be primarily described, and thus, explanations of portions in common with Embodiment 1 are omitted.

<Configuration Example of Industrial Control Device 620>

Figure 15:
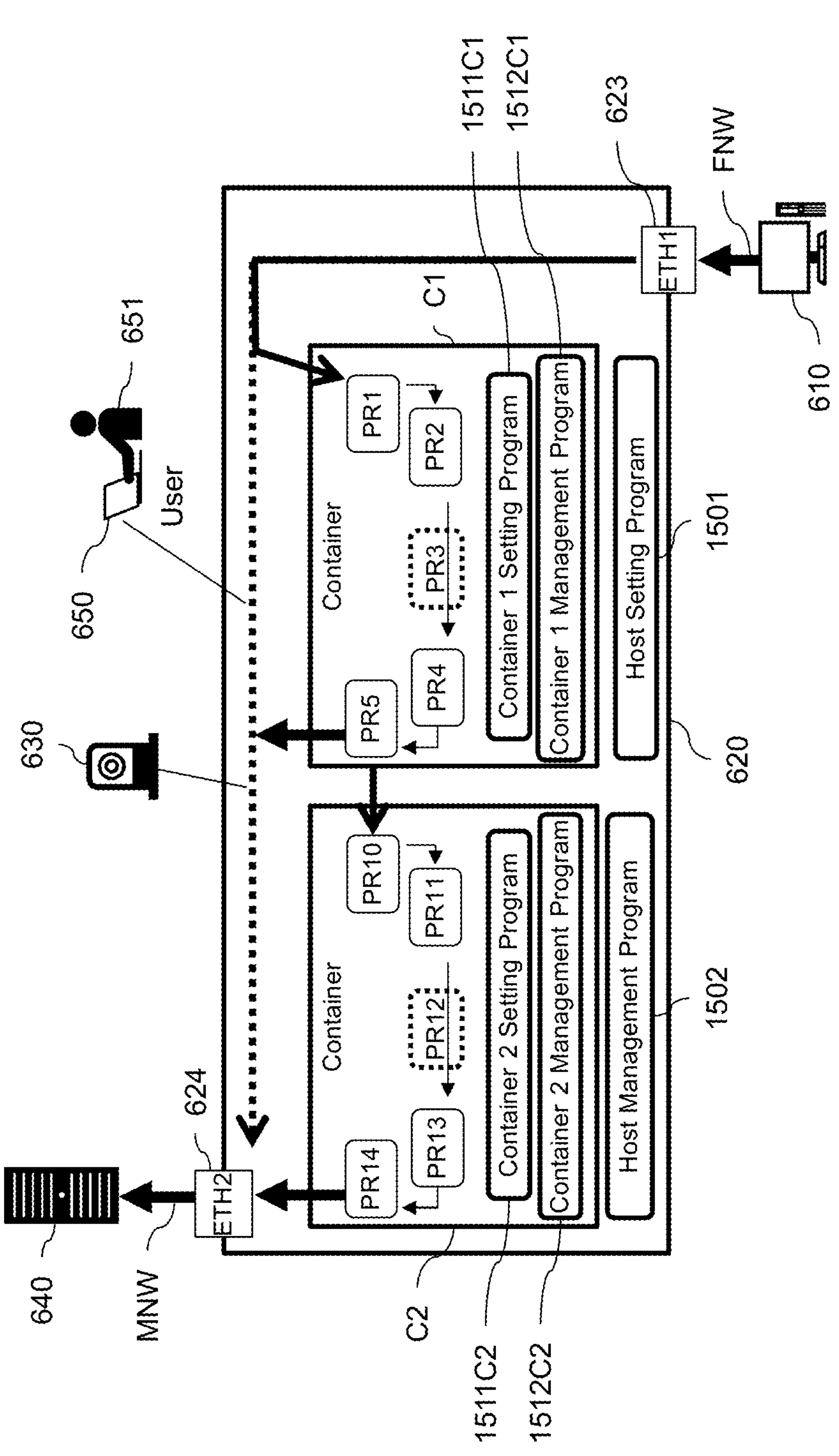
FIG. 15 is a descriptive view showing a configuration example of an industrial control device 620 according to Embodiment 2.

FIG. 15 is a descriptive view showing a configuration example of an industrial control device 620 according to Embodiment 2. The industrial control device 620 has a host setting program 1501 and a host management program 1502 as the host. Also, the industrial control device 620 has containers C1 and C2 as guests started up by the host. The number of containers may be three or more, but in FIG. 15, an example is shown in which the number of containers is two.

The container C1 has a container 1 setting program 1511C1, a container 1 management program 1512C1, and programs PR1 to PR5. The container C2 has a container 2 setting program 1511C2, a container 2 management program 1512C2, and programs PR10 to PR14.

The container C1 executes the programs PR1 to PR5 specialized for virus checking, for example. The container C2 executes processing of safe data that has passed the virus checking in the container C1 using programs PR10 to PR14. As a result, the container C2 can set the data that has passed through the virus checking process so as to be compatible with the protocol of the management network MNW.

<User Setting Table>

FIG. 16 is a descriptive drawing showing an example of a user setting table according to Embodiment 2. The user setting table 1600 is provided with a host status 1601H, a container 1 status 1601C1, and a container 2 status 1601C2 instead of the status 1101.

The host status 1601H is a region indicating whether the host protocol was selected by the user 651. The container 1 status 1601C1 is a region indicating whether the container 1 protocol was selected by the user 651. The container 2 status 1601C2 is a region indicating whether the container 2 protocol was selected by the user 651. For the container 1 status 1601C1 and the container 2 status 1601C2, "–" means unselectable, or in other words, that the protocol is for the host.

The content of the user setting table 1600 is displayed in the user setting screen 900 of the terminal 650, similar to the configuration shown in FIG. 9.

<Initial Table>

FIG. 17 is a descriptive drawing showing an example of an initial table 1700 according to Embodiment 2. The fields of the initial table 1700 are the same as those of the initial table 1000, but the difference is that the item ID 1005 includes the host protocol as indicated by "0-1," "6-3," "10-2," "11-3," "12-1," and "12-2," for example.

<Creation of Setting Table>

FIG. 18 is a descriptive view showing an example of creation of a setting table according to Embodiment 2. The industrial control device 620 creates a host setting table 1800H, a container 1 setting table 1800C1, and a container 2 setting table C2 on the basis of the initial table 1000 and the user setting table 1100.

Specifically, the host setting table 1800H is created by overwriting, with the setting parameters of the setting parameter items 1102, the setting parameter items 1002 of the entries in the initial table 1700 corresponding to the item IDs 1005 of the entries in the user setting table 1600 for which the statuses 1601H have check marks, for example.

Also, the container 1 setting table 1800C1 is created by overwriting, with the setting parameters of the setting parameter items 1102, the setting parameter items 1002 of the entries in the initial table 1700 corresponding to the item IDs 1005 of the entries in the user setting table 1600 for which the statuses 1601C1 have check marks, for example.

Additionally, the container 2 setting table 1800C2 is created by overwriting, with the setting parameters of the setting parameter items 1102, the setting parameter items 1002 of the entries in the initial table 1700 corresponding to the item IDs 1005 of the entries in the user setting table 1600 for which the statuses 1601C2 have check marks, for example.

If not distinguishing between the host setting table 1800H, the container 1 setting table 1800C1, and the container 2 setting table 1800C2, the foregoing are referred to as the setting tables 1800. If referring to the host setting table 1800H, the container 1 setting table 1800C1, and the container 2 setting table 1800C2 collectively, the foregoing group of setting tables is referred to as a setting table group 1800. If not distinguishing between the container 1 setting table 1800C1 and the container 2 setting table 1800C2, the foregoing are referred to as the container setting tables 1800C.

Figure 19:
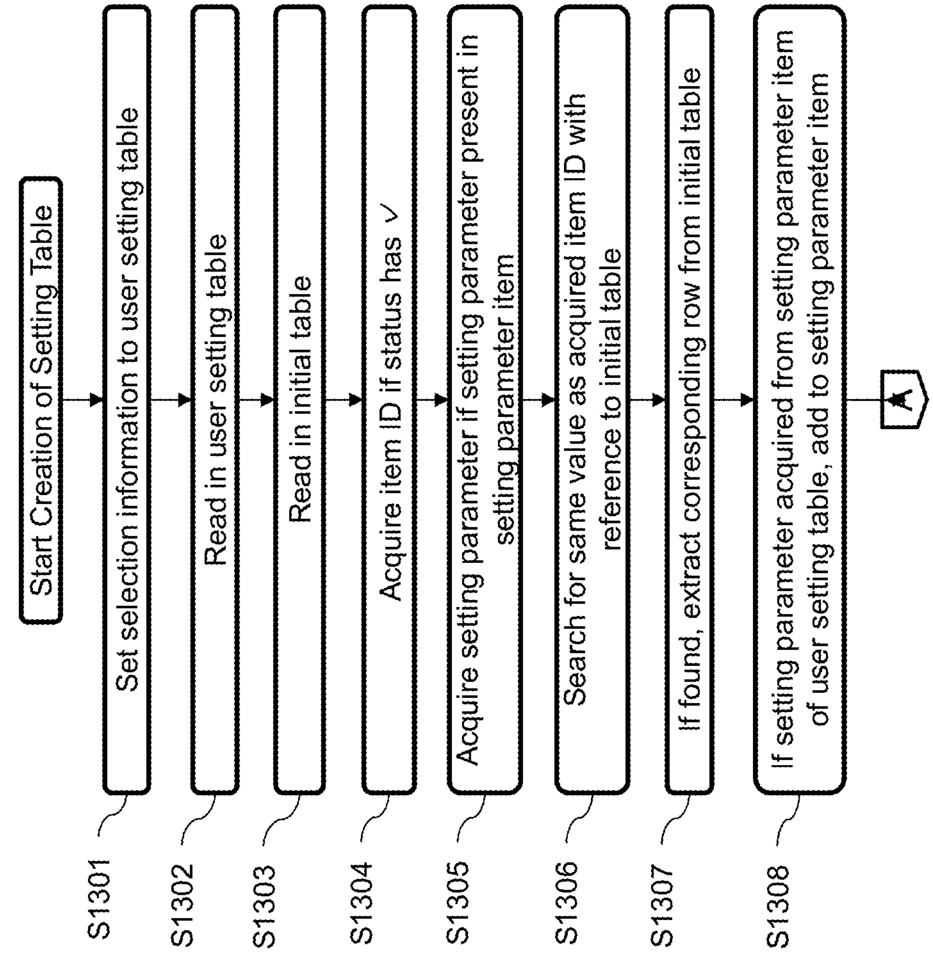
FIG. 19 is a flowchart 1 showing an example of steps of the creation process for the setting table according to Embodiment 2.

FIG. 19 is a flowchart 1 showing an example of steps of the creation process for the setting table 1800 according to Embodiment 2. The host setting program 1501 executes steps S1301 to S1308, similar to FIG. 13. As a result, the host setting table 1800H is created, and the process progresses to step S2001 of FIG. 20.

Figure 20:
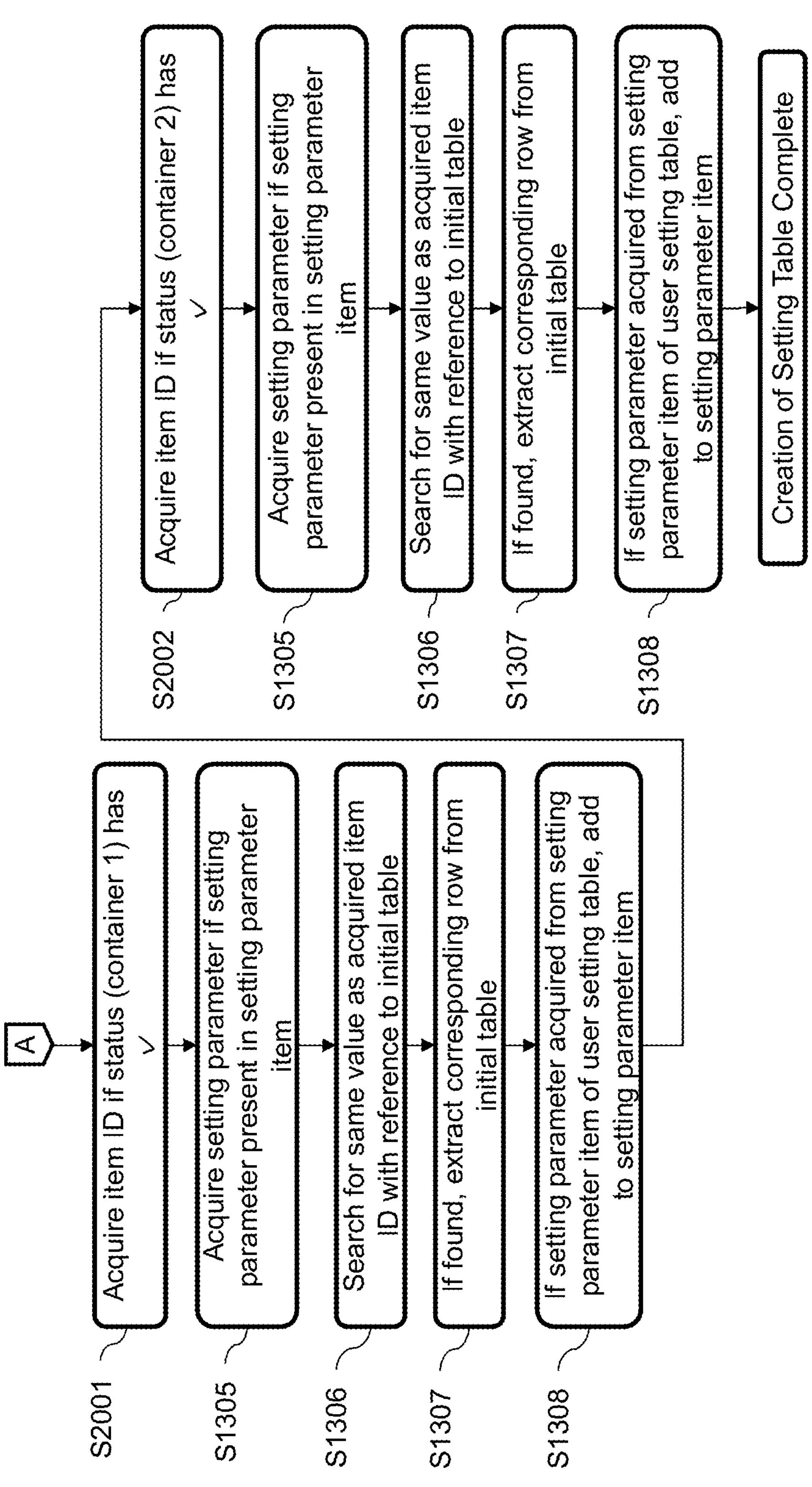
FIG. 20 is a flowchart 2 showing an example of steps of the creation process for the setting table according to Embodiment 2.

FIG. 20 is a flowchart 2 showing an example of steps of the creation process for the setting table 1800 according to Embodiment 2. The container 1 setting program 1511C1 acquires the item ID 1005 of the entry if the corresponding status (container 1) column 1601C1 has a check mark (step S2001). The container 1 setting program 1511C1 executes steps S1305 to S1308, similar to FIG. 13, for each of the item IDs 1005 acquired in step S2001. As a result, the container 1 setting table 1800C1 is created, and the process progresses to step S2002.

The container 2 setting program 1511C2 acquires the item ID 1005 of the entry if the corresponding status (container 2) column 1601C2 has a check mark (step S2002). The container 2 setting program 1511C2 executes steps S1305 to S1308, similar to FIG. 13, for each of the item IDs 1005 acquired in step S2001. As a result, the container 2 setting table 1800C2 is created, and the setting program 621 ends the series of processes.

If there is another container C# in addition to the containers C1 and C2, then for the other container C#, a container # setting program 1511C# acquires the item ID 1005 of the entry if the corresponding status (container #) column 1601C# has a check mark, and executes steps S1305 to S1308, similar to FIG. 13. As a result, a container # setting table 1800C# is created.

<Setting Industrial Control Device 620>

Figure 22:
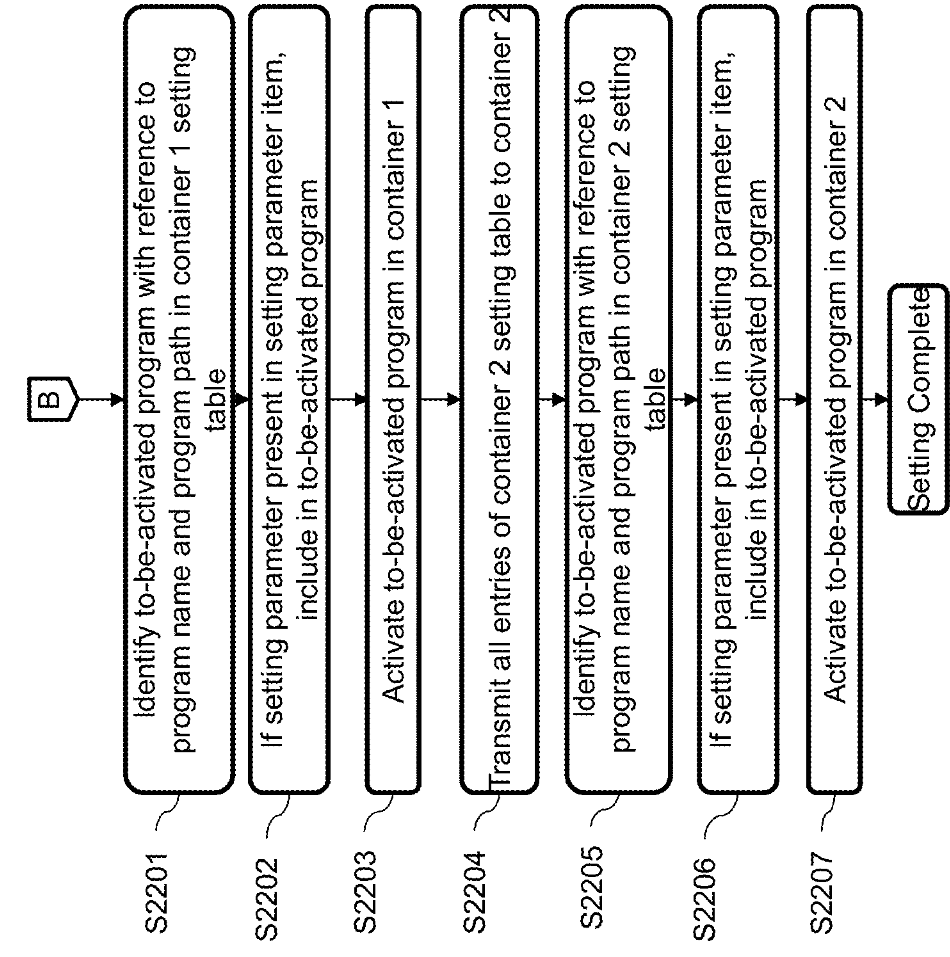
FIG. 22 is a flowchart 2 showing an example of setting process steps for the industrial control device according to Embodiment 2.

FIG. 21 is a flowchart 1 showing an example of setting process steps for the industrial control device 620 according to Embodiment 2. FIG. 22 is a flowchart 2 showing an example of setting process steps for the industrial control device 620 according to Embodiment 2. Upon detecting completion of creating the setting table group 1800 shown in FIGS. 19 and 20 (step S2101), the host setting program 1501 reads in the host setting table 1800H (step S2102). The host setting program 1501 refers to the program name 1003 and the program path 1004 in the host setting table 1800H and identifies a to-be-activated program PR in the host (step S2103).

If the setting parameter is present in the setting parameter item 1102 of the host setting program 1800H, the host setting program 1501 includes the setting parameter in the to-be-activated program PR in the identified host (step S2104) and activates the to-be-activated program PR in the identified host (step S2105). Then, the host setting program 1501 transmits all entries of the container 1 setting table 1800C1 to the container C1 (step S2106), and the process progresses to step S2201 of FIG. 22.

Upon receiving all entries of the container 1 setting table 1800C1, the container 1 setting program 1511C1 refers to the program name 1003 and the program path 1004 thereof and identifies the to-be-activated program PR in the container C1 (step S2201).

If the setting parameter is present in the setting parameter item 1102 of the container 1 setting table 1800C1, the container 1 setting program 1511C1 includes the setting parameter in the to-be-activated program PR in the identified container C1 (step S2202) and activates the to-be-activated program PR in the identified container C1 (step S2203). Then, the host setting program 1501 transmits all entries of the container 2 setting table 1800C2 to the container C2 (step S2204).

Upon receiving all entries of the container 2 setting table 1800C2, the container 2 setting program 1511C2 refers to the program name 1003 and the program path 1004 thereof and identifies the to-be-activated program PR in the container C2 (step S2205).

If the setting parameter is present in the setting parameter item 1102 of the container 2 setting table 1800C2, the container 2 setting program 1511C2 includes the setting parameter in the to-be-activated program PR in the identified container C2 (step S2206) and activates the to-be-activated program PR in the identified container C2 (step S2207). Then, the series of processes is ended.

In FIG. 22, a processing example was described in which there are two containers C1 and C2, but if there is another container C# aside from the containers C1 and C2, then the steps S2204 to S2207 are executed for the other container C#. As a result, the to-be-activated program PR in the other container C# is activated.

Therefore, according to Embodiment 2, the industrial control device 620 sets the data to be compatible with a given protocol for the host and the plurality of containers. Therefore, even if the site network FNW in which a transmission source device 501 that transmits the data is disposed is a different management network MNW with a different protocol from the destination device 503 for the data, the destination device 503 can acquire the data from the transmission source device 501.

Also, by setting a plurality of containers, one container executes a virus check on received data, and another container executes the processes of the program PR for data determined to be safe by the virus check. As a result, the other container can execute the processes of the program PR compatible with the protocol in a safe environment with no risk of infection by a virus.

Embodiment 3

Next, Embodiment 3 will be described. In Embodiments 1 and 2, an example was described in which check marks were set for the statuses 1101, 1601H, 1601C1, and 1601C2. In Embodiment 3, an example will be described in which an execution order is set instead of check marks. In Embodiment 3, differences from Embodiments 1 and 2 will be primarily described, and thus, explanations of portions in common with Embodiments 1 and 2 are omitted. Also, the description below will be made in comparison with Embodiment 1, but the same applies with regard to Embodiment 2.

FIG. 23 is a descriptive drawing showing one example of setting information according to Embodiment 3. The difference from the user-settable information 625-1 of FIG. 6 is that, in the setting information 2300, the status 2301 is set to a number indicating the execution order. The smaller the number is, the earlier in the order of execution the status is.

FIG. 24 is a descriptive drawing showing an example of a user setting table 2400 according to Embodiment 3. The difference from the user setting table 1100 of FIG. 11 is that, in the user setting table 2400, the status 2301 is used instead of the status 1101.

<Creation of Setting Table>

FIG. 25 is a descriptive view showing an example of creation of a setting table 2500 according to Embodiment 3. The industrial control device 620 creates a setting table 2500 on the basis of the initial table 1000 and the user setting table 2400. Specifically, the setting table 2500 is created by overwriting, with the setting parameters of the setting parameter items 1102, the setting parameter items 1002 of the entries in the initial table 1000 corresponding to the item IDs 1005 of the entries in the user setting table 2400 for which the statuses 2301 have a number indicating the execution order, and sorting the entries in ascending order of the numbers in the statuses 2301 indicating the execution order, for example.

FIG. 26 is a flowchart showing an example of steps of the creation process for the setting table 2500 according to Embodiment 3. The setting program 621 identifies the entry with the item ID 1005 of the user setting table 2400 that is the selection information (number indicating the execution order) from the terminal 650 and sets the number indicating the execution order to the status 2301 of the identified entry (step S2601).

The setting program 621 reads in the user setting table 2400 (step S2602). The setting program 621 reads in the initial table 1000 (step S2603). The setting program 621 acquires a row n of the initial table 1000 (step S2604) and sets a variable i pertaining to the number indicating the execution order to i=1 (step S2605).

The setting program 621 acquires the item ID 1005 of the entry if the corresponding status 2301 has the number i indicating the execution order (step S2606). Next, the setting program 621 acquires the setting parameter if the setting parameter has been inputted to the setting parameter item 1102 in the entry of the user setting table 2400 for which the item ID 1005 was acquired in step S2606 (step S2607).

Next, the setting program 621 refers to the initial table 1000 and searches for the same value as the item ID 1005 acquired in step S2606 among the item IDs 1005 of the initial table 1000 (step S2608).

Next, if the same value as the item ID 1005 acquired in step S2606 is found among the item IDs 1005 of the initial table 1000, then the setting program 621 extracts the corresponding entry from the initial table 1000 (step S2609).

Next, if a setting parameter is acquired from the setting parameter item 1102 of the user setting table 2400 in step S2607, then the setting program 621 adds the setting parameter to the setting parameter item 1002 and sets the same as the setting parameter item 1102 (step S2610).

Next, the setting program 621 increments the variable i (step S2611) and determines whether the variable i is greater than n (step S2612). If the variable i is not greater than n (step S2612: No), then the process returns to step S2606. If the variable i is greater than n (step S2612: Yes), then the setting program 621 ends the series of processes. As a result, as shown in FIG. 25, the setting table 2500 is created.

Thus, according to Embodiment 3, the user 651 designates the execution order of the programs PR and the industrial control device 620 sets the data to be compatible with a given protocol. Therefore, as a result of the transfer device 502 of the industrial control device 620 executing the activated programs PR according to the execution order, even if the site network FNW in which a transmission source device 501 that transmits the data is disposed is a different management network MNW with a different protocol from the destination device 503 for the data, the destination device 503 can acquire the data from the transmission source device 501.

Embodiment 4

Next, Embodiment 4 will be described. In embodiments 1 and 3, an example was described in which one container C1-1 is installed in the industrial control device 620-1. In embodiment 4, an example will be described in which the host is installed in the industrial control device 620, but no container is installed. In Embodiment 4, differences from Embodiments 1 and 3 will be primarily described, and thus, explanations of portions in common with Embodiments 1 and 3 are omitted.

Figure 27:
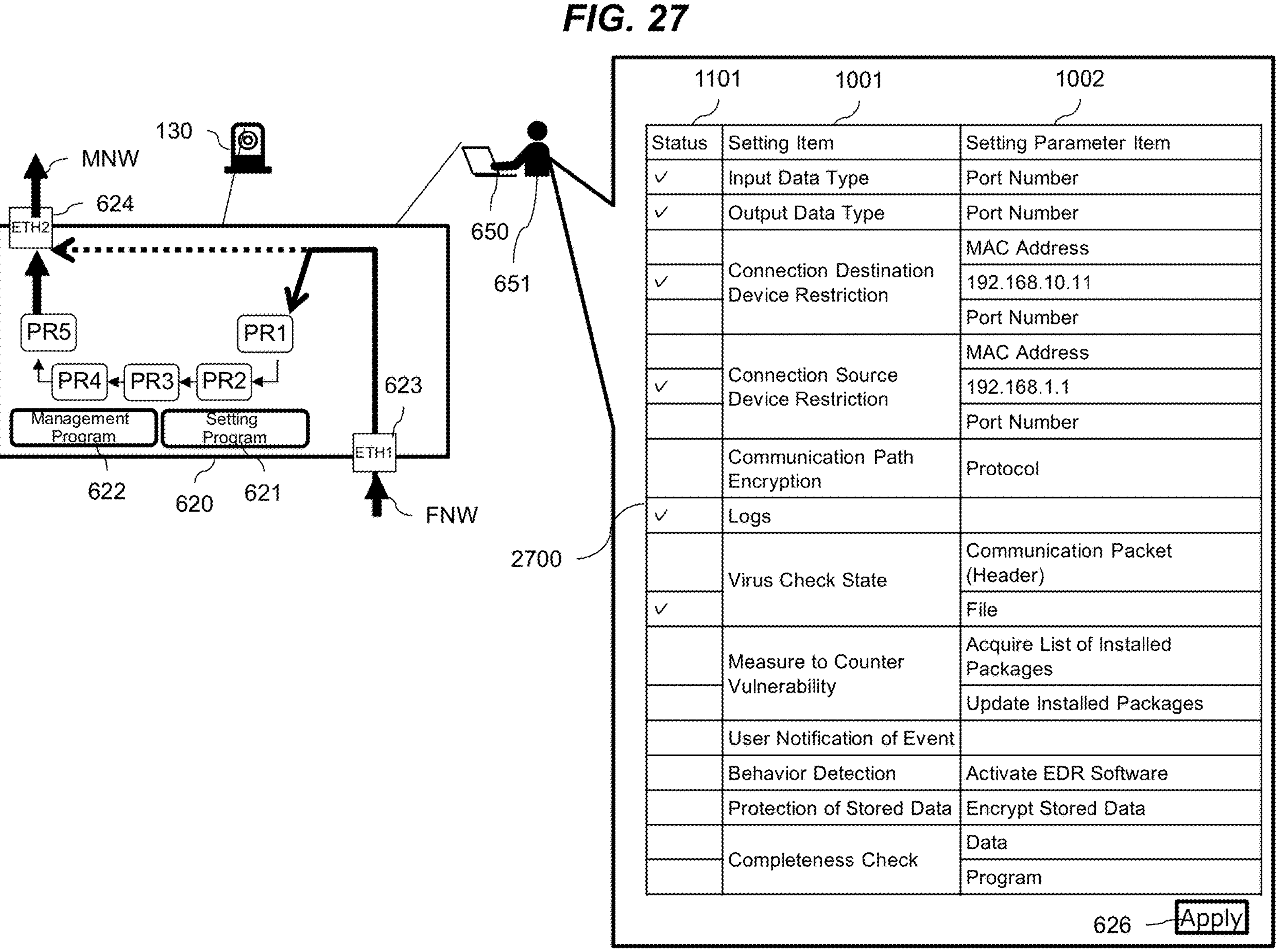
FIG. 27 is a descriptive drawing showing one example of setting information according to Embodiment 4.

FIG. 27 is a descriptive drawing showing one example of setting information according to Embodiment 4. The difference from Embodiments 1 and 3 is that in Embodiments 1 and 3, the container C1 was installed in the industrial control device 620, whereas in Embodiment 4, not one container is installed, and the setting program 621, the management program 622, and the programs PR are installed in the industrial control device 620 that is the host.

Thus, according to Embodiment 4, the industrial control device 620 sets the data to be compatible with a given protocol. Therefore, even if the site network FNW in which a transmission source device 501 that transmits the data is disposed is a different management network MNW with a different protocol from the destination device 503 for the data, the destination device 503 can acquire the data from the transmission source device 501.

Embodiment 5

Next, Embodiment 5 will be described. Embodiment 5 is an example in which the setting tables 1200, 1800, and 2500 of Embodiments 1 to 4 can be updated. In Embodiment 5, differences from Embodiments 1 to 4 will be primarily described, and thus, explanations of portions in common with Embodiments 1 to 4 are omitted. Also, the description below will be made in comparison with Embodiment 1, but the same applies with regard to Embodiments 2 to 4.

<Update of Setting Table>

FIG. 28 is a descriptive view showing an example of updating a setting table 1200 according to Embodiment 5. The updating of the setting table 1200 is performed by creating a new setting table 1200 according to the process steps shown in FIG. 13, and the industrial control device 620 updates the original setting table 1200 with a new setting table 1200. The new setting table 1200 is referred to as an updated setting table 2800. If the new setting table 1200 is created, then the updated setting table 2800 is also updated. As a result, there is no change in the item IDs 1005 of the original setting table 1200, but the content of the setting parameter items 1002 is rewritten, entries of the original setting table 1200 are deleted, and entries not in the original setting table 1200 are added.

<Setting Industrial Control Device 620>

FIG. 29 is a flowchart 1 showing an example of setting process steps for the industrial control device 620 according to Embodiment 5, and FIG. 30 is a flowchart 2 showing an example of setting process steps for the industrial control device 620 according to Embodiment 5. Until the process of FIGS. 29 and 30 is completed, the original setting table 1200 continues to exist without being overwritten by the updated setting table 2800.

Upon detecting completion of creating the updated setting table 2800 (step S2901), the setting program 621 reads in the original setting table 1200 (step S2902). The setting program 621 reads in the updated setting table 2800 (step S2903). The setting program 621 acquires the item IDs 1005 from the original setting table 1200 and the updated setting table 2800 (step S2904). In step S2904, the setting program 621 creates all combinations of the item IDs 1005 of the original setting table 1200 and the item IDs 1005 of the updated setting table 2800.

The setting program 621 selects one set of unselected item IDs 1005 from the created combination group, and determines whether the item IDs 1005 of the selected set match each other (step S2905). If the item IDs do not match (step S2905: No), then the process progresses to step S3001 of FIG. 30.

If the item IDs match (step S2905: Yes), then the setting program 621 acquires the setting parameters from the setting parameter items 1002 of the entries where the selected set of item IDs 1005 are present, for the original setting table 1200 and the updated setting table 2800 (step S2906).

The setting program 621 determines whether both of the acquired setting parameters match (step S2906). If the setting parameters match (step S2906: Yes), then the process progresses to step S3007 of FIG. 30.

If the setting parameters do not match (step S2907: No), then the setting program 621 refers to the program name 1003 and the program path 1004 in the updated setting table 2800 and identifies a to-be-activated program PR (step S2908).

If the setting parameter is present in the setting parameter item 1102, the setting program 621 includes the setting parameter in the identified to-be-activated program PR (step S2908). The setting program 621 activates the identified to-be-activated program PR (step S2910). Then, the process progresses to step S3007 of FIG. 30.

In FIG. 30, if there are no matching item IDs 1005 in step S2905 (step S2905: No), the setting program 621 determines whether the item IDs 1005 of the updated setting table 2800 are present in the original setting table 1200 for the selected set of item IDs 1005 (step S3001).

If the item IDs 1005 are not present in the original setting table 1200 (step S3002: No), then the setting program 621 refers to the program name 1003 and the program path 1004 in entries where the selected item IDs 1005 are present in the updated setting table 2800 to identify a to-be-activated program PR (step S3002).

If the setting parameter is present in the setting parameter item 1102, the setting program 621 includes the setting parameter in the identified to-be-activated program PR (step S3003). The setting program 621 activates the identified to-be-activated program PR (step S3004). Then, the process progresses to step S3007.

On the other hand, if the item IDs 1005 are present in the original setting table 1200 (step S3002: Yes), then the setting program 621 refers to the program name 1003 and the program path 1004 in entries where the selected item IDs 1005 are present in the original setting table 1200 to identify a to-be-deactivated program PR (step S3005). The setting program 621 deactivates the identified to-be-deactivated program PR (step S3006). Then, the process progresses to step S3007.

Then, the setting program 621 determines whether all item IDs 1005 in the updated setting table 2800 have been confirmed (step S3007). That is, the setting program 621 determines whether the matching determination of step S2905 has been executed for all combinations created in step S2904. If not all item IDs 1005 in the updated setting table 2800 have been confirmed (step S3007: No), then the process returns to step S2905, and one unselected group of item IDs 1005 is selected.

On the other hand, if all item IDs 1005 have been confirmed (step S3007: Yes), then the setting program 621 overwrites the original setting table 1200 with the updated setting table 2800 (step S3008). As a result, the setting program 621 ends the series of processes.

Thus, in Embodiment 5, the setting tables 1200, 1800, and 2500 can be updated with the updated setting table 2800. Thus, it is possible to set the programs in the industrial control device 620 so as to match the protocol corresponding to changes in the data-collected system 610 of the site F.

Embodiment 6

Embodiment 6 will be described next. Embodiment 6 shows a support example in which, in the configuration of Embodiments 1 to 5, the management program 622 and the host management program 1502 provide support when an anomaly (incident) occurs in the data-collected system 610 of the site F. In Embodiment 6, differences from Embodiments 1 to 5 will be primarily described, and thus, explanations of portions in common with Embodiments 1 to 5 are omitted. Also, the description below will be made in comparison with Embodiment 1, but the same applies with regard to Embodiments 2 to 5.

Figure 31:
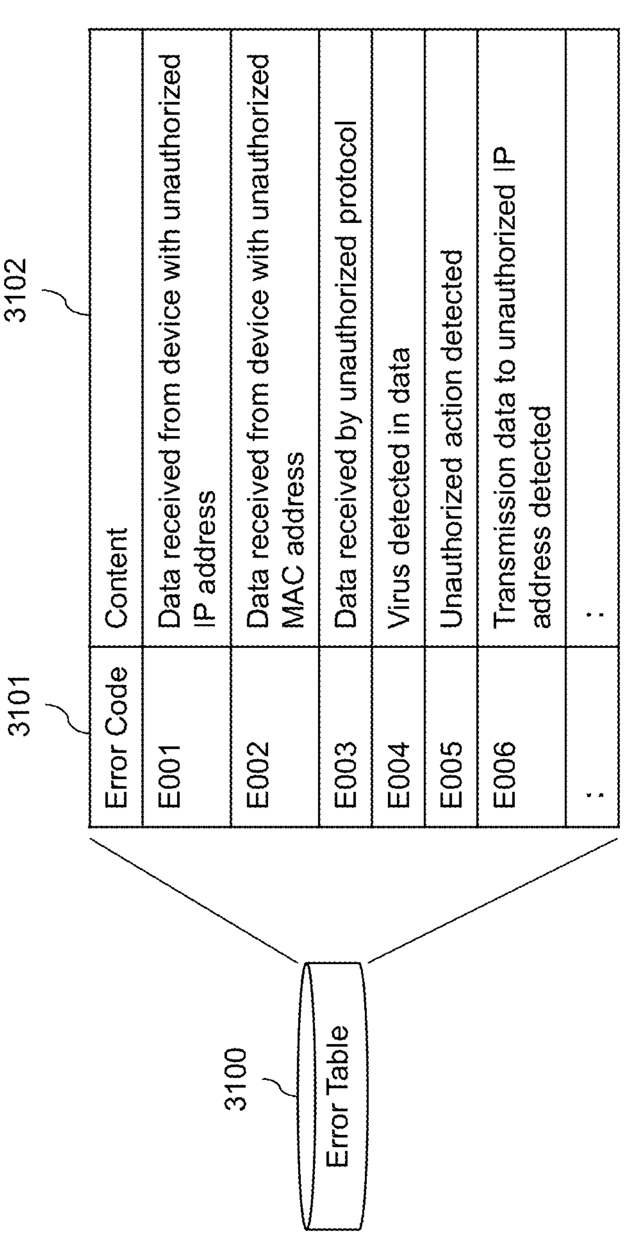
FIG. 31 is a descriptive view showing an example of an error table.

FIG. 31 is a descriptive view showing an example of an error table. The management program 622 can refer to an error table 3100. The error table 3100 has, as fields, an error code 3101 and content 3102. A combination of fields of the same row constitutes an entry defining each error.

The error code 3101 is identification information that uniquely identifies an error. The content 3102 is text data stating details of the error.

Figure 32:
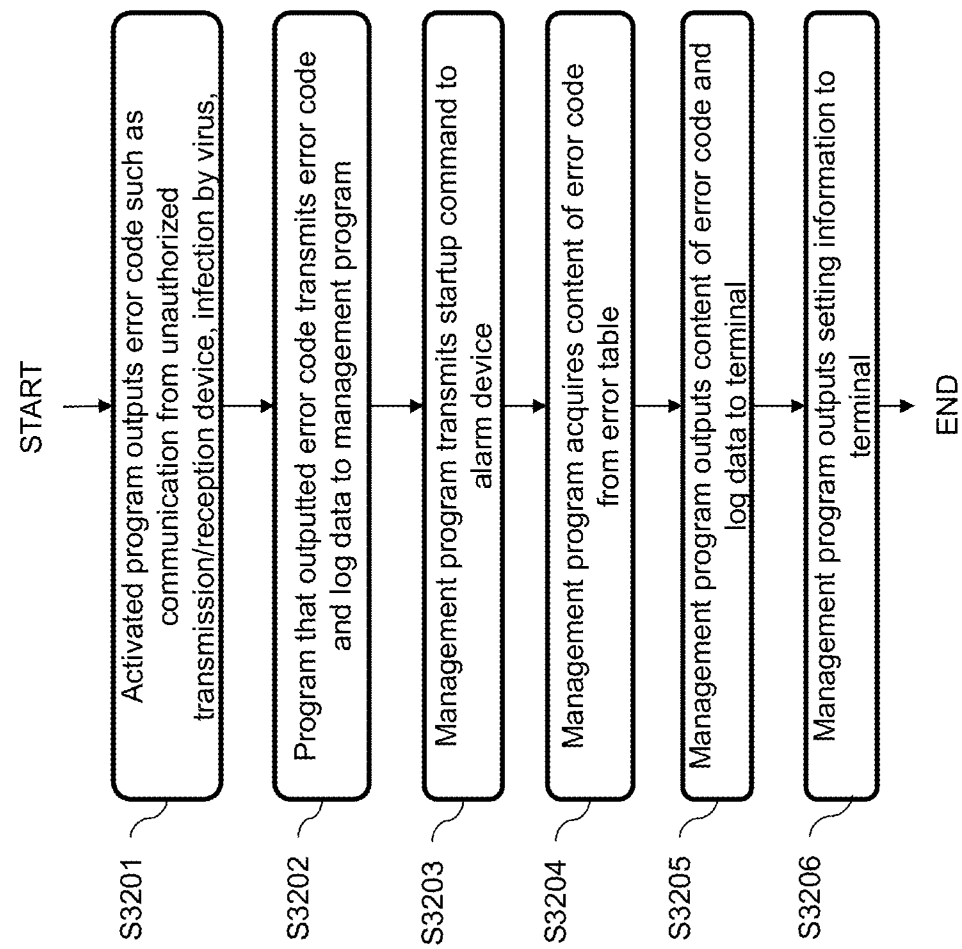
FIG. 32 is a flowchart showing an example of a support process for when an anomaly (incident) occurs in the data-collected system of the site F.

FIG. 32 is a flowchart showing an example of a support process for when an anomaly (incident) occurs in the data-collected system 610 of the site F. Upon receiving data from an unauthorized device or a virus being detected in received data, the activated program PR outputs the corresponding error code 3101 (step S3201).

The program PR outputting the error code 3101 transmits the error code 3101 and log data pertaining to the received data to the management program 622 (step S3202).

The management program 622 transmits a startup command to a warning device 630 (step S3203). As a result, the warning device 630 is started up and outputs a warning.

The management program 622 acquires the content 3102 corresponding to the error code 3101 from the error table 3100 (step S3204).

The management program 622 outputs the content 3102 corresponding to the error code 3101 and the log data acquired in step S3204 to the terminal 650 (step S3205). As a result, the content 3102 and the log data are displayed in the screen of the terminal 650.

The management program 622 outputs the user-settable information 625 to the terminal 650 (step S3206). As a result, the user-settable information 625 and the apply button 626 are displayed in the screen of the terminal 650. Then, when the user 651 presses the apply button 626, the processes shown in FIGS. 13, 29, and 30 are executed.

Thus, according to Embodiment 6, the user 651 of the terminal 650 can be notified when an anomaly (incident) is detected in the data-collected system 610 of the site F.

Additionally, the transfer device 502 according to Embodiments 1 to 6 can also have the following configurations (1) to (10).

(1) A transfer device 502 that receives data from a transmission source device 501, executes a process on the data, and transmits the data on which the process was executed to a destination device 503, wherein the transfer device has a processor 801 that executes a program group (group of programs PR), and a storage device 802 that stores the program group and initial setting information (initial table 1000), wherein each program in the program group matches any protocol (setting item 1001, item ID 1005) including a reception protocol (e.g., the input data type of the setting item 1001) pertaining to reception of the data from the transmission source device 501, a processing protocol (e.g., connection destination device restriction of setting item 1001) pertaining to the process, or a transmission protocol (e.g., the output data type of the setting item 1001) pertaining to transmission of the data to the destination device 503, wherein the initial setting information defines designation information (program name 1003, program path 1004) that designates the program matching the protocol for each protocol, and wherein the processor 801 executes:

a reception process of receiving input of a first setting parameter (e.g., port number) to a first program that matches the reception protocol and the transmission protocol;

an acquisition process of acquiring first designation information for designating the first program with reference to the initial setting information; and an activation process of activating the first program using the first designation information and the first setting parameter.

(2) The transfer device 502 of (1) may have a configuration wherein the storage device 802 stores reference setting information (user setting table 1100), wherein the reference setting information defines, for each protocol, a status 1101 for which selection or non-selection of the protocol can be set, and a setting parameter item 1102 for which a setting parameter for the program matching the protocol can be set, wherein, in the reception process, the processor 801 transmits the reference setting information (entries of the user setting table 1100) to the terminal 650, receives from the terminal 650 selection of the reception protocol and the transmission protocol and input of the first setting parameter to the first program, and updates the status 1101 and the setting parameter item 1102 of the reference setting information, wherein the processor 801 executes a creation process for creating combined setting information (setting table 1200), that associates the selected reception protocol and transmission protocol, the updated status 1101, and the first designation information, and wherein, in the activation process, the processor 801 activates the first program using the first designation information and the first setting parameter with reference to the combined setting information.

(3) The transfer device 502 of (1) may have a configuration wherein, in the reception process, the processor 801 receives selection of the processing protocol, wherein, in the acquisition process, the processor 801 acquires second designation information for designating a second program matching the processing protocol with reference to the initial setting information, and wherein, in the activation process, the processor 801 activates the second program using the second designation information.

(4) The transfer device 502 of (3) may have a configuration wherein, in the reception process, the processor 801 receives input of a second setting parameter (e.g., IP address) to the second program, and wherein, in the activation process, the processor 801 activates the second program using the second designation information and the second setting parameter.

(5) The transfer device 502 of (1) may have a configuration further comprising:

one or more containers, wherein the container includes the program group, and a setting program that causes the processor to execute the reception process, the acquisition process, and the activation process.

(6) The transfer device 502 of (1) may have a configuration further comprising:

a plurality of containers; and a host that can start up the plurality of containers, wherein each of the plurality of containers includes the program group pertaining to the containers, and a setting program that executes the reception process, the acquisition process, and the activation process for the program group pertaining to the containers, and wherein the host includes the program group pertaining to the host, and a setting program that causes the processor to execute the reception process, the acquisition process, and the activation process for the program group pertaining to the host.

(7) The transfer device 502 of (4) may have a configuration wherein, in the reception process, the processor 801 receives the execution order of the first program and the second program, and wherein the processor 801 executes:

an execution control process of controlling execution of the first program and the second program according to the execution order.

(8) The transfer device 502 of (2) may have a configuration wherein the processor 801 executes:

an update process of updating the combined setting information on the basis of a change in the reference setting information.

(9) The transfer device 502 of (8) may have a configuration wherein, in the activation process, the processor 801 deactivates a program present in the combined setting information prior to being updated and not present in the combined setting information that has been updated.

(10) The transfer device 502 of (1) may have a configuration wherein the storage device 802 has error information indicating an anomalous state in the transmission source device 501, and wherein the processor 801 executes:

a warning process of outputting a warning if, as a result of the first program, the transmission source device 501 is detected as being in an anomalous state defined in the error information.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A transfer device that receives data from a transmission source device, executes a process on the data, and transmits the data on which the process was executed to a destination device, a processor configured to execute a program group; and a storage device configured to store the program group and initial setting information, the transfer device comprising:

wherein each program in the program group matches a reception protocol pertaining to reception of the data from the transmission source device, a processing protocol pertaining to the process, or a transmission protocol pertaining to transmission of the data to the destination device, wherein the initial setting information defines designation information that designates, for each protocol, the program matching the protocol, and wherein the processor is configured to execute:

a reception process of receiving input of a first setting parameter to a first program that matches the reception protocol and the transmission protocol;

an acquisition process of acquiring first designation information for designating the first program with reference to the initial setting information; and an activation process of activating the first program using the first designation information and the first setting parameter wherein the storage device stores reference setting information, wherein the reference setting information defines, for each protocol, a status for which selection or non-selection of the protocol can be set, and a setting parameter item for which a setting parameter for the program matching the protocol can be set, wherein, in the reception process, the processor is configured to transmit the reference setting information to the terminal, receives, from the terminal, selection of the reception protocol and the transmission protocol and input of the first setting parameter to the first program, and updates the status and the setting parameter item of the reference setting information, wherein the processor is configured to execute a creation process for creating combined setting information that associates the selected reception protocol and transmission protocol, the updated status, and the first designation information, wherein, in the activation process, the processor is configured to activate the first program using the first designation information and the first setting parameter with reference to the combined setting information, wherein the processor is configured to execute an update process of updating the combined setting information on the basis of a change in the reference setting information, and wherein, in the activation process, the processor is configured to deactivate a program present in the combined setting information prior to being updated and not present in the combined setting information that has been updated.

2. The transfer device according to claim 1, wherein, in the reception process, the processor receives selection of the processing protocol, wherein, in the acquisition process, the processor is configured to acquire second designation information for designating a second program matching the processing protocol with reference to the initial setting information, and wherein, in the activation process, the processor is configured to activate the second program using the second designation information.

3. The transfer device according to claim 2, wherein, in the reception process, the processor is configured to receive input of a second setting parameter to the second program, and wherein, in the activation process, the processor is configured to activate the second program using the second designation information and the second setting parameter.

4. The transfer device according to claim 3, wherein, in the reception process, the processor is configured to receive an execution order of the first program and the second program, and wherein the processor is configured to execute:

an execution control process of controlling execution of the first program and the second program according to the execution order.

5. The transfer device according to claim 1, further comprising:

one or more containers, wherein the container includes the program group, and a setting program that causes the processor to execute the reception process, the acquisition process, and the activation process.

6. The transfer device according to claim 1, further comprising:

a plurality of containers; and a host that can start up the plurality of containers, wherein each of the plurality of containers includes the program group pertaining to the containers, and a setting program that executes the reception process, the acquisition process, and the activation process for the program group pertaining to the containers, and wherein the host includes the program group pertaining to the host, and a setting program that causes the processor to execute the reception process, the acquisition process, and the activation process for the program group pertaining to the host.

7. The transfer device according to claim 1, wherein the storage device has error information indicating an anomalous state in the transmission source device, and wherein the processor is configured to execute:

a warning process of outputting a warning if, as a result of the first program, the transmission source device is detected as being in an anomalous state defined in the error information.

8. A transfer method by a transfer device that receives data from a transmission source device, executes a process on the data, and transmits the data on which the process was executed to a destination device, wherein the transfer device has a processor that executes a program group, and a storage device that stores the program group and initial setting information, wherein each program in the program group matches a reception protocol pertaining to reception of the data from the transmission source device, a processing protocol pertaining to the process, or a transmission protocol pertaining to transmission of the data to the destination device, wherein the initial setting information defines designation information that designates, for each protocol, the program matching the protocol, and wherein the processor executes:

a reception process of receiving selection of the reception protocol and the transmission protocol, and input of a first setting parameter to a first program that matches the reception protocol and the transmission protocol;

an acquisition process of acquiring first designation information for designating the first program with reference to the initial setting information; and an activation process of activating the first program using the first designation information and the first setting parameter, wherein the storage device stores reference setting information, wherein the reference setting information defines, for each protocol, a status for which selection or non-selection of the protocol can be set, and a setting parameter item for which a setting parameter for the program matching the protocol can be set, wherein, in the reception process, the processor transmits the reference setting information to the terminal, receives, from the terminal, selection of the reception protocol and the transmission protocol and input of the first setting parameter to the first program, and updates the status and the setting parameter item of the reference setting information, wherein the processor executes a creation process for creating combined setting information that associates the selected reception protocol and transmission protocol, the updated status, and the first designation information, wherein, in the activation process, the processor activates the first program using the first designation information and the first setting parameter with reference to the combined setting information, wherein the processor executes an update process of updating the combined setting information on the basis of a change in the reference setting information, and wherein, in the activation process, the processor deactivates a program present in the combined setting information prior to being updated and not present in the combined setting information that has been updated.

* * * * *